(12) United States Patent
Haemers

(10) Patent No.: US 9,718,103 B2
(45) Date of Patent: Aug. 1, 2017

(54) DEVICES AND METHODS FOR SOIL REMEDIATION

(75) Inventor: Jan Haemers, Brussels (BE)

(73) Assignee: Good Earthkeeping Organization, Inc., Corona, CA (US)

( * ) Notice: Subject to any disclaimer, the term of this patent is extended or adjusted under 35 U.S.C. 154(b) by 0 days.

(21) Appl. No.: 13/880,615

(22) PCT Filed: Oct. 24, 2011

(86) PCT No.: PCT/EP2011/068554
§ 371 (c)(1),
(2), (4) Date: Apr. 19, 2013

(87) PCT Pub. No.: WO2012/055818
PCT Pub. Date: May 3, 2012

(65) Prior Publication Data
US 2013/0202363 A1    Aug. 8, 2013

(30) Foreign Application Priority Data

Oct. 25, 2010  (EP) ..................................... 10447027
Oct. 25, 2010  (EP) ..................................... 10447028

(51) Int. Cl.
*B09C 1/00*     (2006.01)
*B09C 1/06*     (2006.01)

(52) U.S. Cl.
CPC .............. *B09C 1/005* (2013.01); *B09C 1/00* (2013.01); *B09C 1/06* (2013.01)

(58) Field of Classification Search
CPC ....... B09C 1/005; B09C 1/06; B09C 2101/00; E02D 3/11
(Continued)

(56) References Cited

U.S. PATENT DOCUMENTS 3,994,341 A    11/1976  Anderson et al.
5,271,693 A *  12/1993  Johnson et al. ........... 405/128.4
(Continued)

FOREIGN PATENT DOCUMENTS

EP          1 604 749       12/2005
WO       WO 03/035290        5/2003

*Primary Examiner* — John Kreck
*Assistant Examiner* — Carib Oquendo
(74) *Attorney, Agent, or Firm* — K&L Gates LLP; Louis C. Cullman; Robert W. Winn

(57) ABSTRACT

The present invention provides devices or systems and a method for remediating a soil comprising contaminants, comprising the steps of: —introducing in said soil at least one perforated column for contaminant extraction from a contaminated region of said soil; in close proximity of said at least one perforated column introducing at least one non-perforated column for providing heat to said contaminated region of said soil; providing heat to said at least one non-perforated column; extracting said contaminant vapor containing said soil contaminants out of said contaminated region of said soil into said at least one perforated column; removing said contaminant vapor from said at least one perforated column, thereby providing remediated soil; wherein said at least one perforated column and said at least one non-perforated column are connectable to at least one surface-located device comprising a combustion, a heating and control unit for heating and thereby cleaning said soil.

9 Claims, 12 Drawing Sheets

(58) Field of Classification Search
USPC ..... 405/128.1, 128.15, 128.2, 128.4, 129.27,
405/131; 166/60, 248, 302, 303
See application file for complete search history.

(56) References Cited

U.S. PATENT DOCUMENTS

| | | | |
|---|---|---|---|
| 5,449,251 A * | 9/1995 | Daily et al. | 405/128.35 |
| 5,558,463 A | 9/1996 | Geisel | |
| 5,986,159 A * | 11/1999 | Aines et al. | 588/19 |
| 6,951,436 B2 * | 10/2005 | Stegemeier et al. | 405/128.4 |
| 2005/0111917 A1 * | 5/2005 | Vinegar et al. | 405/128.4 |
| 2005/0276662 A1 * | 12/2005 | Smith | 405/128.2 |
| 2008/0069640 A1 * | 3/2008 | Haemers et al. | 405/128.85 |
| 2008/0232904 A1 * | 9/2008 | Shiau | 405/128.5 |

* cited by examiner

DEVICES AND METHODS FOR SOIL REMEDIATION

TECHNICAL FIELD

The present invention relates to the field of solid waste treatment and recycling, especially to soil remediation. The invention relates to methods and devices for cleaning soils containing contaminants, more in particular to a methods and devices for volatilizing contaminants in the soil by thermal conduction and effectively and efficiently using the devices. The methods and devices are in particular characterized in that recycling is targeted, in particular in the field of construction, especially in the field of geothermal energy.

BACKGROUND

The contamination of surface and near-surface soils has become a matter of great concern in many locations. Soil may become contaminated with chemical, biological, and/or radioactive contaminants. Material spills, leaking storage vessels, and landfill seepage of improperly disposed materials are just a few examples of the many ways in which soil may become contaminated. If left in place, many of these contaminants will find their way into aquifers, air, or into the food supply, and could become public health hazards.

There are many proposed methods for removal of surface contaminants, such as excavation followed by incineration, in situ vitrification, biological treatment, chemical additives for deactivation, radiofrequency heating, etc. Although successful in some applications, these methods can be very expensive and are not practical if many tons of soil must be treated.

A process that may be used to remove contaminants from subsurface soil is a soil vapor extraction process. In such process a vacuum is applied to the soil to draw air and vapor through subsurface soil. The vacuum may be applied at a soil/air interface, or the vacuum may be applied through vacuum wells placed within the soil. The air and vapor may entrain and carry volatile contaminants towards the source of the vacuum. Off-gas removed from the soil by the vacuum which includes contaminants that were within the soil is then transported to a treatment facility wherein it is processed to eliminate, or reduce contaminants to acceptable levels. The disadvantage of this method is that the method is limited to the extraction of contaminants present in vapor form.

In situ thermal desorption may be used to increase the effectiveness of a soil vapor extraction process, the vaporization of soil contaminants may be supported by thermal desorption. In situ thermal desorption involves in situ heating of the soil to raise the temperature of the soil while simultaneously removing off-gas from the soil. Heat added to contaminated soil may raise the temperature of the soil above vaporization temperatures of contaminants within the soil and cause the contaminants to vaporize. A vacuum applied to the soil allows drawing of the vaporized contaminant out of the soil.

A method of heating a soil containing contaminants comprising the injection of a heated fluid into the soil is, for instance described in EP 1604749. The herein described method consists of introducing a system of perforated columns into the soil. A stream of hot air is sent through the columns. The hot air is injected into the soil through perforations in the columns at the level of the pipe perforations. A contaminant vapor is formed in the soil, which may be removed from the soil through the perforations in the columns and disposed to an off-gas treatment unit.

A major drawback of this method is that large amounts of energy are required for the heating process, much of which is lost upon transport to or from the soil. The vaporized contaminants travel long distances through heat-conductive, non-isolated material before a treatment facility is reached. Fuel required for the heating process is expensive. From an energy point of view, the method is costly and not environmentally friendly. Moreover, the perforated columns are expensive. The major part of the cost is due to the perforation of the columns. Although the columns may be re-used a limited number of times in the same application, their recycling is limited to the same type of soil and/or contamination. The storage of these columns prior to their re-employability is expensive.

Hence, there remains a need in the art to reduce the cost of the process further and to reduce its carbon foot-print. The present invention aims to provide a solution to at least one of the above-mentioned problems by providing a methods and devices for cleaning a soil containing contaminants which provides energy savings, is less expensive, easy to install, easy to use and is suitable for use in follow-on applications. In particular, the present invention aims to provide methods and systems for soil remediation wherein heat-losses are reduced as transport of heated fluids is kept to a minimum. Moreover, the present invention aims to provide a method and system for soil remediation wherein the perforated columns that have been driven into the soil for cleaning need not be removed after the soil has been remediated but can be re-used for other purposes.

SUMMARY OF THE INVENTION

The present invention relates to a method and a device for cleaning a soil containing contaminants. The methods and systems disclosed herein are meant for cleaning soil from both volatile and semi-volatile contaminants. The methods and systems according to the present invention are applied for cleaning contaminated soil either in situ or after excavation of the contaminated soil. The invention is characterized in that the lumen of columns of the system for cleaning contaminated soil can be used for recycling the device, in particular as geothermal piles and/or gravity piles.

In a first aspect, the present invention provides a method for remediating a soil comprising contaminants, comprising the steps of:
- introducing in said soil at least one perforated column for contaminant extraction from a contaminated region of said soil,
- in close proximity of said at least one perforated column introducing at least one non-perforated column for providing heat to said contaminated region of said soil,
- providing heat to said at least one non-perforated column (18) thereby heating said contaminated region of said soil to a temperature sufficient to cause vaporization of said soil contaminants and obtaining a contaminant vapor,
- extracting said contaminant vapor containing said soil contaminants out of said contaminated region of said soil into said at least one perforated column,
- removing said contaminant vapor from said at least one perforated column, thereby providing remediated soil,
wherein said at least one perforated column and said at least one non-perforated column are connectable to at least one surface-located device comprising a combustion, a heating and control unit for heating and thereby cleaning said soil.

In another embodiment, the present invention provides a method for remediating a soil comprising contaminants, comprising the steps of:

introducing and/or creating in said soil at least one vapor passage way for contaminant extraction from a contaminated region of said soil, in close proximity or in said at least one vapor passage way introducing at least one non-perforated column for providing heat to said contaminated region of said soil, providing heat to said at least one non-perforated column thereby heating said contaminated region of said soil to a temperature sufficient to cause vaporization of said soil contaminants and obtaining a contaminant vapor, extracting said contaminant vapor containing said soil contaminants out of said contaminated region of said soil into said at least one vapor passage way, removing said contaminant vapor from said at least one vapor passage way, thereby providing remediated soil, wherein said at least one vapor passage way and said at least one non-perforated column are connectable to at least one surface-located device comprising a combustion, a heating and control unit for heating and thereby cleaning said soil.

In a preferred embodiment, the present invention provides a method further comprising the step of:

providing said non-perforated column with fluid guiding means over at least a substantial part of its length, and coupling said fluid guiding means to a network of pipes connected to said one surface-located device.

In a preferred embodiment, the present invention provides a method for soil remediation, wherein a negative pressure is provided for the extraction of said contaminant vapor from said contaminated region of said soil.

In a preferred embodiment, the present invention provides a method wherein heat is provided to said non-perforated column in a regular intermittent pattern.

In another aspect, the present invention provides a device or system for the remediation of a soil comprising contaminants, said device comprising at least one perforated and at least one non-perforated column, wherein the at least one perforated column is connectable to a vacuum providing means for extraction of a contaminant vapor from said soil, and wherein the non-perforated column has a shaft manufactured from a heat-conductive material, the shaft is provided with a lumen extending in axial direction, at one end the lumen is permanently closed, at the opposite end the lumen is connectable to a heat source for the vaporization of said soil contaminants.

In another embodiment, the present invention provides a device or system for the remediation of a soil comprising contaminants, said device comprising at least one vapor passage way and at least one non-perforated column, wherein the at least one vapor passage way is connectable to a vacuum providing means for extraction of a contaminant vapor from said soil, and wherein the non-perforated column has a shaft manufactured from a heat-conductive material, the shaft is provided with a lumen extending in axial direction, at one end the lumen is permanently, at the opposite end the lumen is connectable to a heat source for the vaporization of said soil contaminants.

In a preferred embodiment the vapor passage way of the device or system according to the present invention, is a section of excavated soil.

In a further preferred embodiment, the section of excavated soil of the device or system according to the present invention is provided with a vapor permeable material.

In a further preferred embodiment, the average mean particle size of the vapor permeable material is comprised between 2 and 8 mm, preferably between 3 and 7 mm, more preferably between 4 and 6 mm.

In a preferred embodiment, the present invention provides a device, wherein said lumen is provided over a substantial part of the length of the at least one non-perforated column. The presence of the lumen will guide the fluid circulation. This is advantageous for an improved heat delivery.

In a preferred embodiment, the present invention provides a device, wherein a section of the lumen is provided with heat retention material.

In a further preferred embodiment, the present invention provides a device, wherein the heat retention material is removable.

In a preferred embodiment, the present invention provides a device, wherein said heat conductive material is steel, preferably stainless steel.

In another aspect, the invention relates to use of a device according to an embodiment of the invention, for remediation of a contaminated soil and for providing geothermal energy to a construction, preferably said construction is a building. A soil remediation device according to an embodiment of the invention can advantageously be recycled and used as a geothermal energy device.

In another aspect, the invention relates to use of a device according to an embodiment of the invention, for remediation of a contaminated soil and for providing a gravity foundation to a construction. A soil remediation device according to an embodiment of the invention can advantageously be recycled and used in a stabilizing means for construction erected on top of or in close proximity of the soil that is provided with the stabilizing means.

The method, device and uses provided by the invention are advantageous as a multi-purpose system is provided which incorporates different functionalities, reducing construction time, allowing materials to be re-used. The method provided by the invention reduces waist, provides energy savings as heat losses are reduced, cost cuts, easy to modify, straightforward in use.

Figure 1:
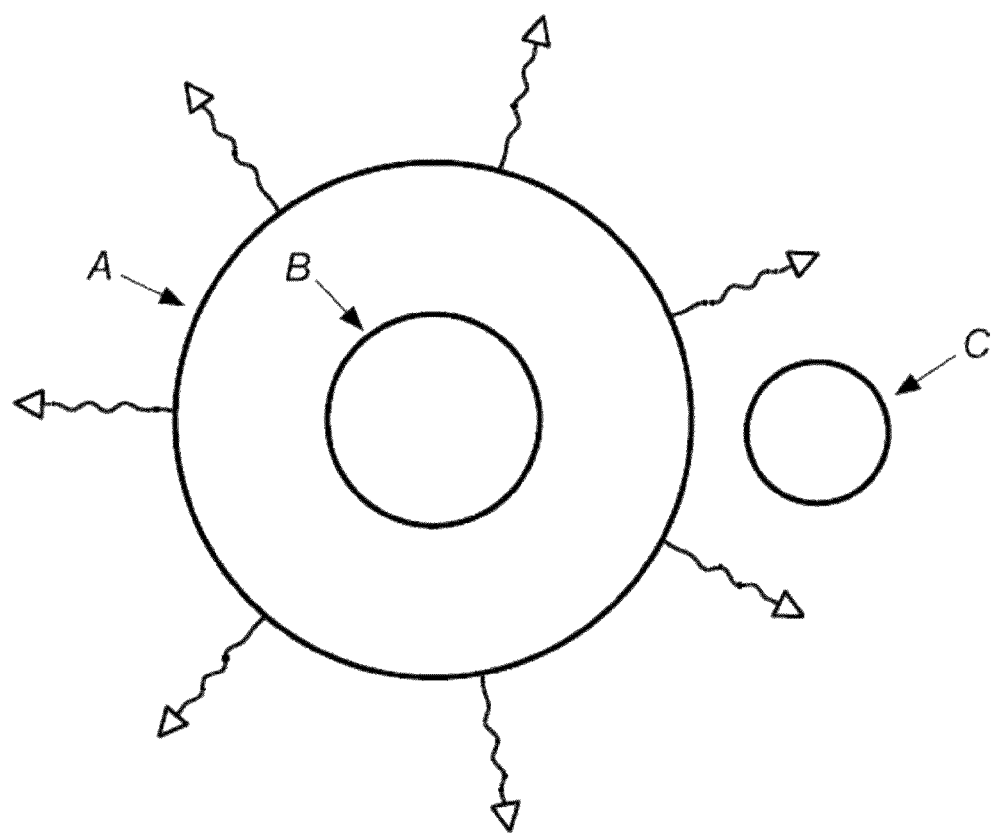
FIG. 1 is a schematic drawing representing a top view on a heat-conductive column (B) provided with a concentric pipe (A) for transporting a heated fluid into said column. In close proximity of the heat-conductive column a perforated column (C) is provided.

While the invention is susceptible to various modifications and alternative forms, specific embodiments thereof are shown by way of example in the drawings and will herein be described in detail. The drawings may not be to scale. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise," "comprising," and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints.

In particular, the present invention provides a device for the remediation of a contaminated soil, also referred to as "soil remediation device".

The present invention provides a method for remediating a soil containing contaminants.

By the term "remediating" or "remediation" as used herein, it is meant a process for reducing the load of contaminants. The term "cleaning" can be regarded as a synonym.

In the context of this description, the term "soil" includes but is not limited to sand, silt, clay, peat, organic material and blends thereof.

The terms "soil containing contaminants" and "contaminated soil" are used herein as synonyms and are to be understood as including all types of soils which may be contaminated with chemical, biological, and/or radioactive contaminants, including but not limited to frozen soils, very wet soils, soils with a high clay content, soil containing coal residues, sediments, slurry, sludge, contaminated waste, cakes or the like.

The term "contaminants" includes but is not limited to organics compounds, in particular hydrocarbons, especially polyaromatic hydrocarbons abbreviated as PAH, BTEX and other aliphatic or aromatic hydrocarbons in the C10-C70 range, chlorinated solvents, polychlorinated biphenyls abbreviated as PCB's, pesticides, MTBE and other organic products found in the soil and groundwater, as well as inorganic compounds such as cyanides, mercury or other semi-volatile compounds.

The term "BTEX" as used herein, is to be understood to mean benzene, toluene, ethylbenzene and xylene. These are volatile monocyclic aromatic compounds present in coal tar and petroleum products. BTEX are the most soluble of the major gasoline compounds and may be indicative of gasoline contamination.

The term "MTBE" as used herein, is to be understood to mean methyl tert-butyl ether, also known as methyl tertiary butyl ether, abbreviated as MTBE. MTBE is a chemical compound with molecular formula $C_5H_{12}O$. MTBE is a volatile, flammable and colorless liquid. MTBE is a gasoline additive.

In particular, the present invention provides a method for remediating a soil comprising contaminants, comprising the step of: introducing a heat exchange device in said soil.

By the term "heat exchange device" used herein, it is meant a device capable of exchanging heat. The heat exchange device of the present invention preferably comprises one, preferably at least two or more columns.

The at least two columns comprise a perforated and non-perforated column. Both columns are provided with a lumen extending in axial direction. By the term "lumen" used herein, it is meant that the columns are hollow. Or in other words, a vertical enclosed space is provided. At one end the lumen is connectable to a heat source, at the opposing end the lumen is closed. The lumen may be provided at the closed end with a cone shaped tip. This is advantageous for inserting the column into soil.

The terms "columns", "pipes" and "tubes" are used herein as synonyms and are to be understood as including heat-conductive materials that may provide a columnar structure comprising a lumen. By the term "heat-conductive materials" used herein, it is meant materials capable of conducting heat, such as but not limited to steel, stainless steel, metal, or ceramics.

The non-perforated column has a shaft manufactured from a heat-conductive material. In a preferred embodiment, said column is made of steel, preferably stainless steel.

The perforated column has a shaft manufactured from stainless steel or carbon steel.

For reasons of clarity the following description will be directed to a system comprising at least two columns, in particular a set of a perforated and a non-perforated column wherein the non-perforated column is for heating of the contaminated soil, and the perforated column is for extracting of contaminant vapors originating from soil heated in close proximity to the perforated column. It will be clear to the person of skill in the art that the number of columns may vary depending on their dimensions and the amount and condition of the soil to be cleaned from contaminants.

In a preferred embodiment, the present invention provides a device that can be used for in situ remediation of a contaminated soil or for the remediation of an excavated soil. As synonym to the word device, the word system can be used.

In a preferred embodiment, the present invention provides a device comprising at least one non-perforated column 18 and a vapor passage way 16, 19, 35, 38. In another preferred embodiment, the present invention provides a device for soil remediation comprising a set of non-perforated column 18 and a vapor passage way 16, 19, 35, 38. The non-perforated column 18 is used for heating the contaminated soil. The vapor passage way can be a perforated column 16, 19 or a section of excavated soil 35, 38. The vapor passage way is used for extracting the contaminant vapors originating from soil heated in close proximity of the vapor passage way. It will be clear to the person of skill in the art that the number of columns and vapor passage ways may vary depending on their dimensions and the amount and condition of the soil to be cleaned from contaminants.

Columns suitable for use in the invention comprise a lumen. By the term "lumen" used herein, it is meant that the columns are hollow. Or in other words, an enclosed space is provided. The provision of a lumen provides a space for the insertion of, for example, a tube inside the column. In a preferred embodiment, the non-perforated column 18 comprises a concentric fluid introduction pipe 17.

The columns may be of any desired cross sectional shape, including, but not limited to, triangular, rectangular, square, hexagonal, ellipsoidal, round, or, ovate. Preferably, the pipes have a substantially ellipsoidal, round, or, ovate cross sectional shape. In a preferred embodiment, the columns have a substantially round cross-sectional shape.

In a preferred embodiment the columns are not threaded. Preferably said soil remediation device comprises one or more heat-conductive non-threaded columns. More preferably the soil remediation device comprises one, preferably at least two or more heat-conductive non-threaded non-perforated columns.

In Situ Soil Remediation

FIG. 1 illustrates a top view of an embodiment of the soil remediation device where on a non-perforated column (B) provided with a concentric pipe (A) for transporting a heated fluid into said column. In close proximity of the heat-conductive column a perforated column (C) is provided.

Introduction of said soil remediation device is preferably carried out by inserting said columns into said soil by pressure. Pushing the columns into the soil by pressure is advantageous as it optimizes contact between the columns and the soil. It stabilizes the soil surrounding said device.

Figure 2:
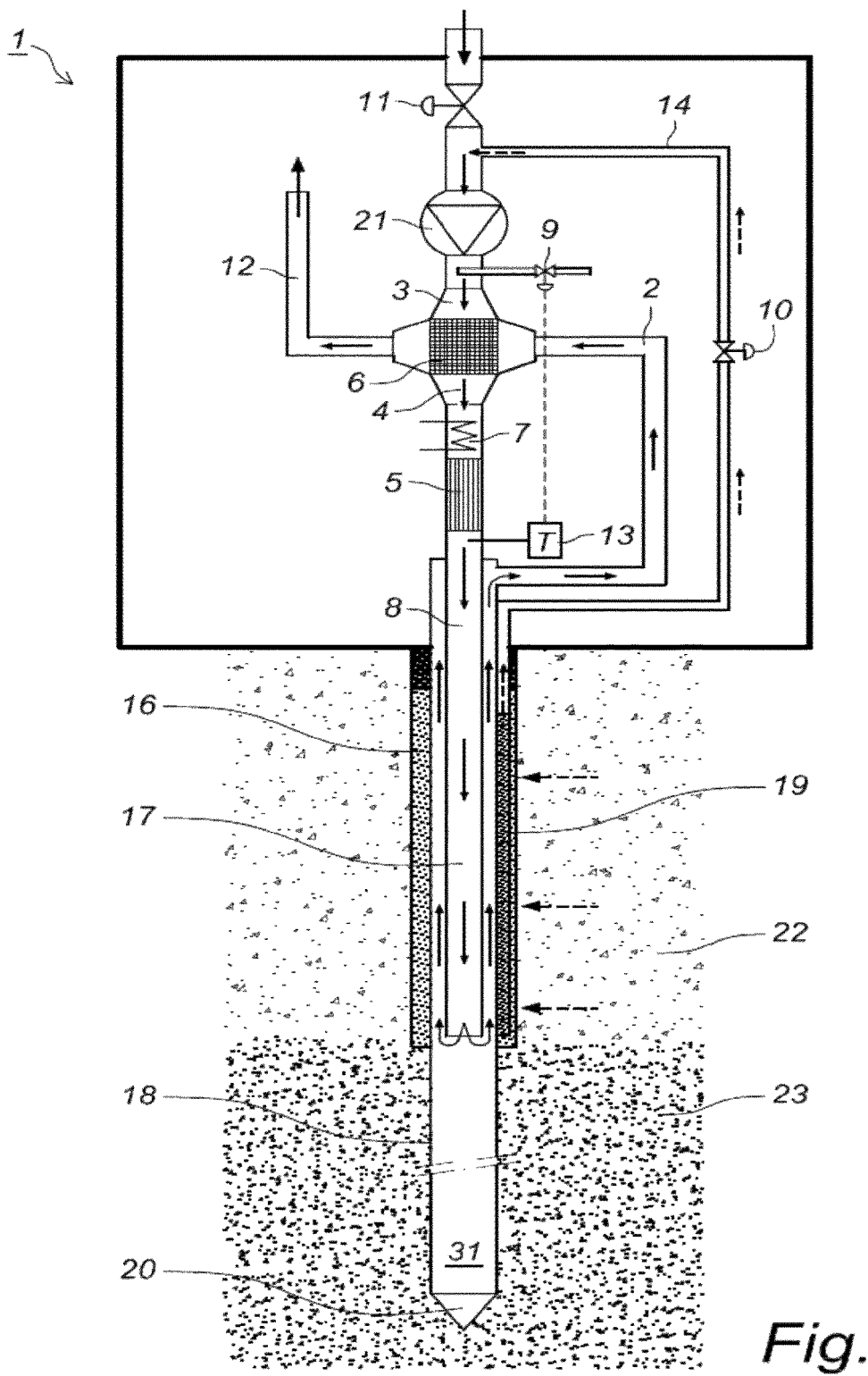
FIG. 2 is an illustration of an embodiment of a soil remediation system according to the present invention. A perforated column is provided as a mantle around the heat-conductive column.
Figure 3:
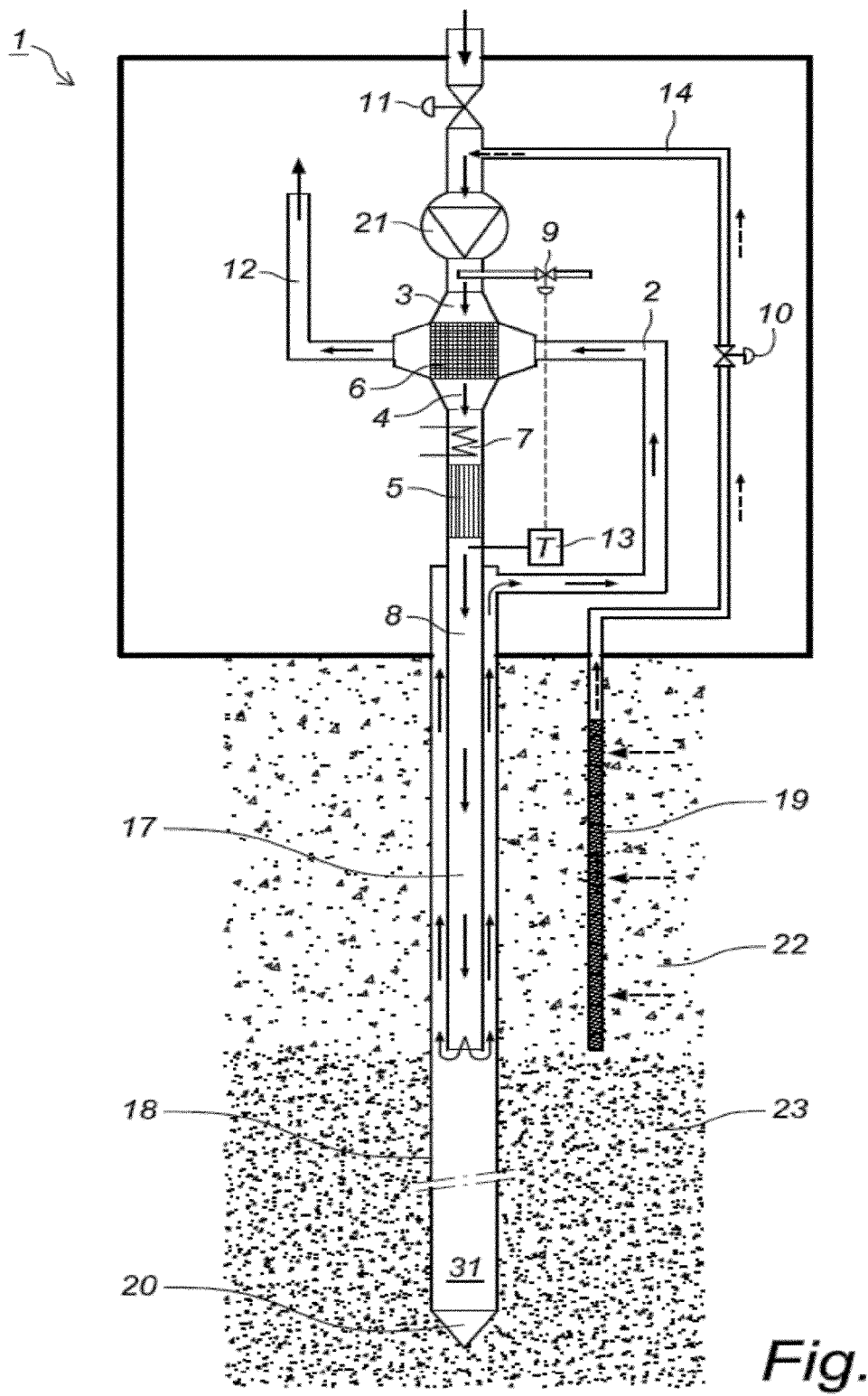
FIG. 3 is an illustration of another embodiment of a soil remediation system according to the present invention. A perforated column is provided in close proximity of a heat-conductive column.

One or more of said vapor passage way are introduced and/or created into said soil. FIG. 2 and FIG. 3 illustrate an embodiment of the soil remediation device where one or more of said perforated columns 16, 19, used as vapor passage ways, are introduced substantially vertically into said contaminated soil. Said perforated columns 16, 19 are positioned at an orientation from 80° (substantially vertical) to 90° (vertical) relative to ground surface. The columns are preferably placed in the soil in an upright position.

Figure 6:
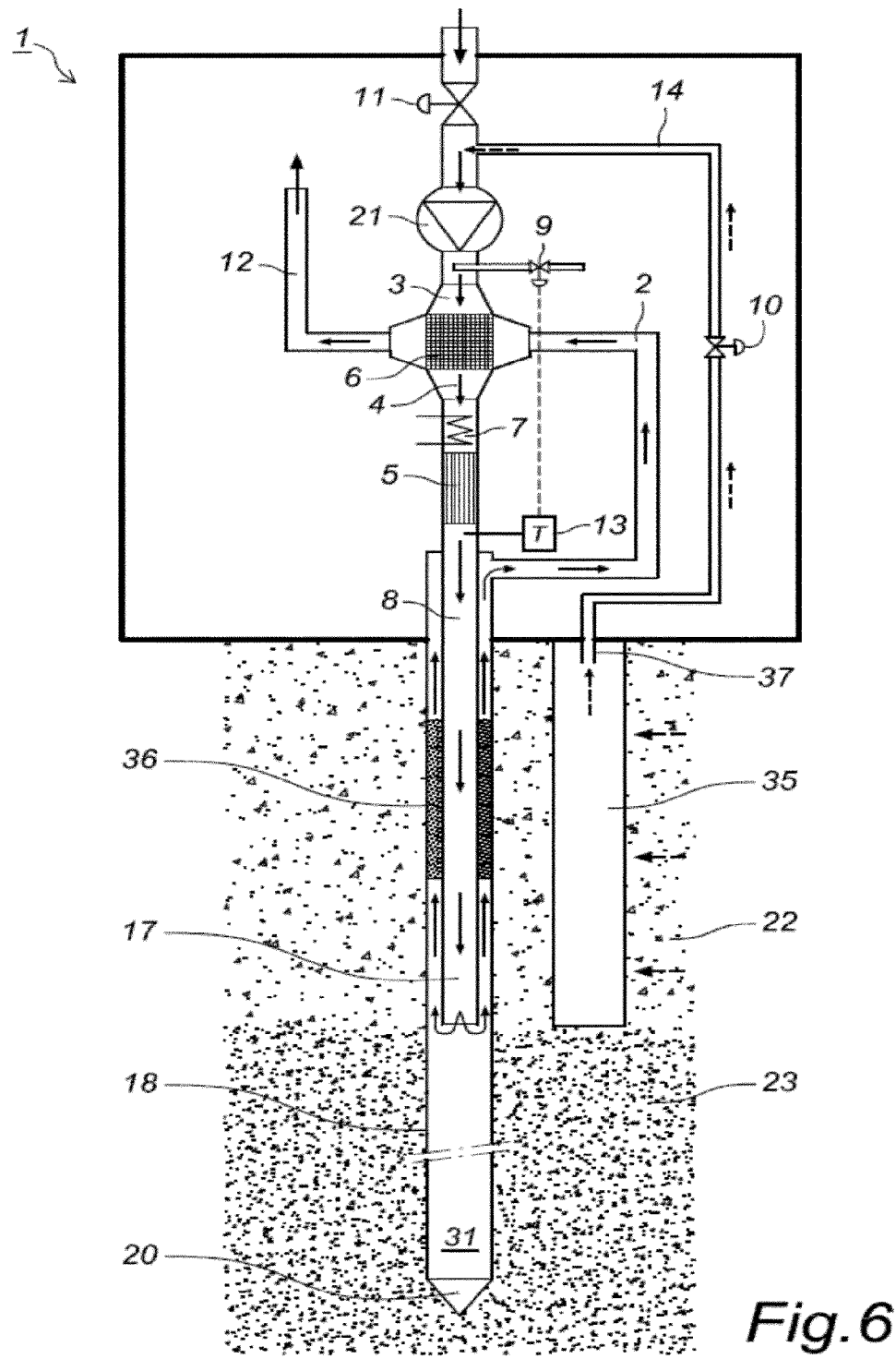
FIG. 6 is an illustration of another embodiment of a soil remediation system according to the present invention. An excavated soil section is provided in close proximity of a heat-conductive column.
Figure 7:
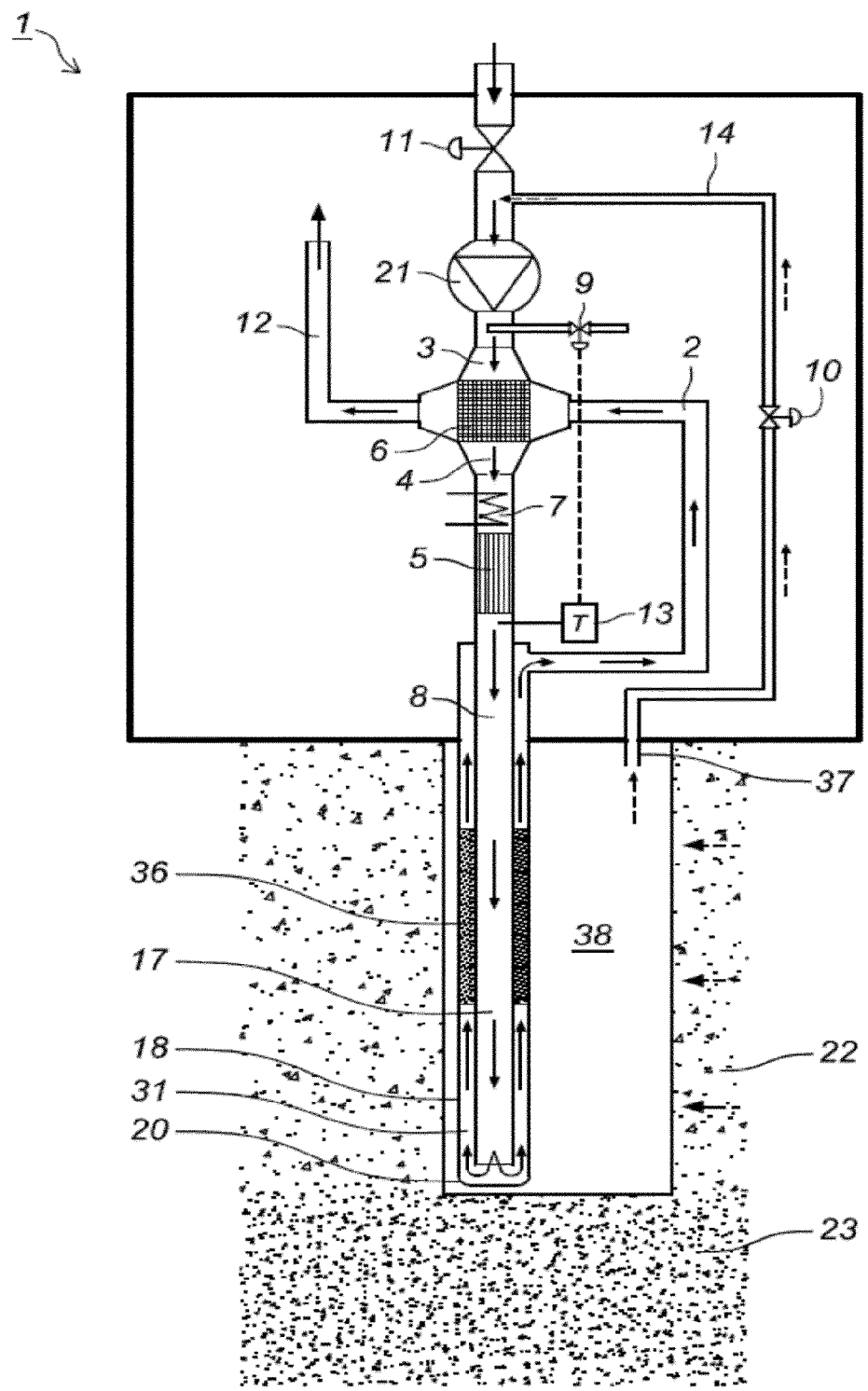
FIG. 7 is an illustration of another embodiment of a soil remediation system according to the present invention. A heat-conductive column is placed in the soil excavated section.

FIG. 6 and FIG. 7 illustrate an embodiment of the present invention where excavated soil sections 35, 38, used as vapor passage ways, are created substantially vertically into said contaminated soil. Said excavated soil sections are positioned at an orientation from 80° (substantially vertical) to 90° (vertical) relative to ground surface. The excavated soil sections are preferably created in the soil in an upright position.

The perforated column has a shaft manufactured from stainless steel or carbon steel.

The excavated soil section can be filled with vapor permeable material such as, but not limited to, gravel or sand; preferably coarse sand. The average mean particle size of the vapor permeable material is comprised between 2 and 8 mm, preferably between 3 and 7 mm, more preferably between 4 and 6 mm.

In a preferred embodiment, the present invention relates to a method, comprising heating said soil by thermal conduction to a temperature sufficient to cause vaporization of said soil contaminants. Preferably, the soil is heated by thermal conduction by circulating a heated fluid through said soil. In addition to allowing greater removal of contaminants from the soil, the increased heat of the soil may result in the destruction of contaminants in situ e.g., contaminants such as hydrocarbon and/or chlorinated hydrocarbon contaminants.

Heat by conduction takes place when two material media or objects are in direct contact, and the temperature of one is higher than the temperature of the other. Heat conduction consists of a transfer of kinetic energy from the warmer medium to the cooler one. The term "conduction" as used herein is therefore meant to refer to all types of heat transfer wherein heat is moved from one (warmer) object to another (cooler) object by direct contact. It shall be understood that in the present invention, where heat transfer by conduction is referred to, also a very small amount of heat is generally also transferred to the soil by means of radiation.

The temperature required to vaporize the soil contaminants is provided by said heat exchange device. Heating up the soil may be obtained by means of pipes that are made of a heat-conductive material, and that are in communication with a heat source. The heat source may provide a heated fluid for circulating through the pipes. Regulation of the temperature of the heat source to a desired temperature then translates to a temperature raise in the pipes and from the pipes the heat is conducted into the soil they are embedded in. The temperature elevation of the soil surrounding the columns to a temperature sufficient to cause vaporization of the soil contaminants results in vaporized soil contaminants.

The pipes are heated by sending and circulating a heated fluid, such as high temperature air and/or gas through the piping. Preferably, the high temperature air/gas is heated to a temperature comprised between 300° C. and 850° C., more preferably comprised between 300° C. and 800° C., even more preferably comprised between 500° C. and 750° C., and most preferably comprised between 550° C. and 750° C. Extremely high temperature can also be employed mainly depending on the temperature limitations of the perforated columns. Thus, in cases where perforated columns are used which can withstand extremely high temperatures, i.e., from 1000 up to 1500° C. a corresponding extremely high temperature air/gas supply can be employed. The heat is transferred to the soil by thermal conduction and progressively elevates the soil temperature. A small amount of heat will also be transferred to the soil by means of radiation. The elevated soil temperature causes the contaminants located within the contaminated soil to volatilize thereby producing a contaminated vapor.

According to the present invention, the soil is heated by conductive heating, which is particularly advantageous because temperatures obtainable by such heating are not limited by the amount of water present in the soil and are nearly not impacted by soil heterogeneity. Soil temperatures substantially above the boiling point of water may be obtained using thermal conductive heating. Soil temperatures of at least about 100° C., 125° C., 150° C., 200° C., 350° C., 400° C., 500° C., 600° C., 700° C., 800° C. or greater may be obtained using thermal conductive heating.

The contaminant vapor is removed from the soil by extracting the contaminant vapor out of said soil, via one or more vapor passage ways.

In a preferred embodiment, the contaminant vapor is removed from the soil by extracting the contaminant vapor out of said soil into said heat exchange device. This may be obtained by providing the columns of the heat-exchange device with perforations. In a preferred embodiment, the present invention relates to a method, wherein said one or more upright perforated columns are perforated. The columns may be perforated by boring, punching or drilling perforations into the longitudinal walls of the columns.

The perforations in the perforated columns may be, but are not limited to, holes and/or slots. Preferably, between 5% and 50% of the surface of a column is provided with holes and/or slots. It is particularly preferred that a large amount of small perforations are provided on the column. The columns may have several perforated zones at different positions along a length of the pipe. When the columns are inserted into the soil, the perforated zones may be located adjacent to contaminated layers of soil. Alternatively the perforations may be provided along the complete length of the columns. In a preferred embodiment, the zone of perforations corresponds to the upper half of the length of the shaft.

Preferably said heat exchange device comprises one or more heat-conductive perforated and non-threaded columns.

Preferably said heat exchange device comprises at least two heat-conductive perforated and non-threaded columns.

In a preferred embodiment, the columns have a diameter which is comprised between 5 and 40 cm, preferably between 8 and 25 cm, more preferably between 10 and 20 cm. In a preferred embodiment, the columns have a substantially round cross-sectional shape. In a particularly preferred embodiment, the columns have a substantially round cross-sectional shape and have a diameter which is comprised between 5 and 40 cm, preferably between 8 and 25 cm, more preferably between 10 and 20 cm.

The columns have a length preferably between 1 and 50 m meter, more preferably between 4 and 30 m, most preferably between 6 and 20 m.

In another preferred embodiment of the present invention, the contaminant vapor is removed from the soil by extracting the contaminant vapor out of said soil, via one or more vapor passage ways. This may be obtained by creating a soil excavated section 35 in close proximity of the heat conductive non-perforated column (FIG. 6). The depth of the excavated soil section corresponds at least to the upper half of the length of the heat conductive non-perforated column.

The section of excavated soil might be filled with vapor permeable material such as, but not limited to gravel or sand; preferably coarse sand. This is advantageous as the gravel can be left in the created vapor passage way for further use of the remediated soil, thus reducing workload.

In another preferred embodiment of the present invention, the contaminant vapor is removed from the soil by extracting the contaminant vapor out of said soil, via one or more vapor passage ways. This may be obtained by creating a soil excavated section 38 wherein the heat conductive non-perforated column will be introduced (FIG. 7). The depth of the excavated soil section is equal to the length of the heat conductive non-perforated column. The section of excavated soil might be filled with vapor permeable material such as, but not limited to gravel or sand; preferably coarse sand.

The contaminant vapor is sucked into the perforated columns. Dragging the vaporized soil contaminants from the soil into the perforated columns may be obtained by imposing a negative pressure on the perforated columns, e.g. by connecting the columns to a vacuum system. The vacuum system may be able to pull a vacuum in the range of 50 Pa to 5000 Pa. The vacuum system may also be able to pull a vacuum in the range of 100 Pa to 1500 Pa. The vacuum system may be a ventilator or a water sealed pump.

The contaminant vapor is sucked into the sections of excavated soil. Dragging the vaporized soil contaminants from the soil into the sections of excavated soil may be obtained by imposing a negative pressure on the sections of excavated soil, e.g. by connecting the the section of excavated soil to a vacuum system. The vacuum system may be able to pull a vacuum in the range of 50 Pa to 5000 Pa. The vacuum system may also be able to pull a vacuum in the range of 100 Pa to 1500 Pa. The vacuum system may be a ventilator or a water sealed pump.

The soil contaminants removed from the soil are transported off, leaving behind soil wherein contaminants were removed. The soil is substantially freed from said contaminants. The method of cleaning described provides a remediated soil.

The vaporized soil contaminants may be transported out of the soil for further treatment. It is advantageous that substantially all the volatilized contaminant vapor is prevented from escaping to the environment. Preferably a nearly closed loop system is used. Preferably the contaminant vapor is treated in an off-gas treatment unit, which is preferably a catalytic oxidizer or thermal oxidizer unit. The contaminants are catalytically oxidized. The contaminant vapor is thereby substantially transformed into a fluid comprising carbon dioxide and water. The catalytic oxidation generates carbon dioxide and water vapor without emission of carbon monoxide, nitrogen oxides (NO and/or NO2) and unburned hydrocarbons.

In a method according to the state of the art, the columns would be removed from the soil following the soil cleaning process. In spite of the columns being re-usable for the same application a number of times, they are eventually discarded.

The inventor realized that the lumen of the columns provides a space that could be suitable for other purposes. In particular, a method is provided whereby said lumen of said heat exchange device is converted to a geothermal energy device or stability providing means.

A method is provided comprising the step of: converting the non-perforated column to a stability providing means for said remediated soil and/or a structure erectable on said remediated soil. The conversion comprises the steps of:

selecting non-perforated columns of a length, diameter and thickness for providing stability to said soil and/or to a structure to be built on said soil, driving one or more non-perforated columns into the contaminated soil thereby providing a stabilized contaminated soil, removing the perforated columns from said previously contaminated region of soil after cleaning, and connecting said one or more non-perforated columns to a structure thereby providing a stabilized structure.

By the term "geothermal energy device" as used herein it is meant an energy conserving device that uses energy from naturally occurring heat or cold in the interior of the earth. A geothermal energy device may be used to heat or cool a structure, provide warmed water for use in the structure or to generate electricity for use in the structure.

During the daytime, the surface of the earth heats up by the sun and cools down again at night, the extent to which this occurs also being dependent on the season. These changes in temperature resulting from the day and night pattern and the influence of the seasons have their effect on the ground up to a specific depth. From a specific depth, roughly calculated from 2 meters down, the soil temperature is more or less constant. By placing below that depth a heat exchanger in the form of a geothermal pile, it is possible, dependent on the soil temperature at the surface, to accomplish a heating or a cooling.

After clean-up, part of the device, in particular the surface-located parts for heating are replaced.

In a preferred embodiment, the present invention relates to a method, comprising the step of replacing a fluid introduction pipe positioned inside said non-perforated pipe with a liquid transportation tube.

The columns in the soil are disconnected from the combustion, heating and control unit on the surface. Instead the columns are connected to a surface network of pipes, preferably of plastic pipes, more preferably of high density polyethylene or polyvinyl chloride pipes, themselves connected to a heat pump.

Upon completion of the remediation phase wherein the soil is cleaned, the inner pipe from stainless steel is preferably replaced by an inner pipe of plastic, such as polyvinylchloride (PVC) or high density polyethylene (HDPE). An inner pipe from stainless steel is used during the remediation phase.

In a preferred embodiment, the present invention relates to a method, comprising the step of connecting said lumen to a network of pipes connected to a heat pump.

Putting the geothermal function into action can be effected at any desired moment; more in particular also after all cleaning activities have been completed and even after a structure, such as a house, have been in use for a shorter or longer period of time.

By having a fluid circulate through the lumen of said columns by means of a heat pump installation, the columns obtain the function of a heat exchanger between the fluid and the ground surrounding the columns driven in the cleaned soil.

In a preferred embodiment of the method of the invention, said columns are closed off using a connecting piece with laterally terminating connecting stub. By using said connecting piece the connection between the outer columns and a heat pump can be established at any desired time. Until then, the columns can be closed off in such a way as not to disturb activities before and after erecting a structure, such as for instance a house, on the cleaned soil. This is advantageous as it means that the installation of the system can be put into use at any desired moment, therefore also long after all building activities have been completed. This possibility is in particular appealing because the cost for the columns can later, without additional costs be rendered suitable to be used as a geothermal energy system. In view of ever increasing energy costs and environmental awareness this can be an extremely useful option. In addition, remaining accessible during use after installation has its advantages regarding, for instance, inspection, repair, maintenance and replacement.

It may be advantageous, in addition to re-using the non-perforated columns to also re-use the perforated columns. Preferably the perforated columns are first converted to non-perforated columns. The perforations can for instance be closed-off by installing an inner tube or lining inside the perforated columns thereby providing a non-perforated lumen. The perforated column provided with an inner tube or lining can then in its lumen be equipped, for instance, with an U-shaped tubing for liquid transport. Liquid can be transported down into the U-shaped tubing and back up again. During transport the liquid can take up heat from the soil or give up heat to the soil. The lined column provided with means for liquid transport in this way may be used as part of a geothermal energy supply system. In a preferred embodiment, the present invention relates to a method, comprising the step of closing off said perforations thereby providing columns leak-proof to liquid.

A suitable technique for closing off said perforations is provided by cured-in-place-piping (CIPP) technology. A target column is inspected and if required, cleaned. A flexible tube impregnated with a resin is installed inside said target column. The tube may be installed by inversion. After the resin is cured, an inner tube is formed. It may function as a lining of the heat-conductive pipe. The lining preferably covers at least those regions of the column with perforations. Use of the cured-in-place technology for closing off said perforations is advantageous as it avoids the need to use a pre-fabricated tube. Space requirements are reduced. The flexible tube is adjustable to different requirements for length, diameter and pressure. This makes the technology flexible in use.

In a preferred embodiment, the present invention relates to a method, comprising the step of inverting and curing a resin impregnated flexible tube inside said one or more upright perforated columns.

The flexible tubing can be made to adhere to the inner wall of said one or more upright perforated columns. This is advantageous as rattling of a tube inside a column can be avoided. Noise levels are reduced. The new lumen thereby formed can have a larger diameter compared to a tube that is not made adhering.

In a preferred embodiment, the present invention relates to a method, comprising the step of adhering said tube to said one or more upright perforated columns.

The invention further provides a heat-exchange device comprising one or more heat-conductive perforated columns embeddable in soil. Said heat exchange system is suitable for use in a method according to an embodiment of the invention. In particular, the invention provides a thermal heat-exchange device for the remediation of a soil comprising contaminants, comprising one or more columns designed as a perforated shaft, manufactured from a heat-conductive material, provided with a lumen extending in axial direction, permanently closed at one end by a cone shaped tip for driving said one or more columns into said contaminated soil, and at the opposite end carrying a connecting means closing of the lumen, which connecting means is for the connection with a fluid introduction pipe which is in communication with a heat source for the volatilization of the contaminants in said soil, characterized in that, said lumen is suitable for creating a circulating fluid flow in the lumen through separation means, such as pipes or hoses, to be provided over at least a part of the length and which can be coupled to a fluid circulation circuit located outside the column thereby providing a geothermal energy device.

The separation means can consist of a hose which is inserted via a connecting stub into the column to a point near the bottom end of the lumen. The separation means can also be formed by a rigid pipe instead of by a flexible hose.

The fluid circulation circuit may comprise a pipe system fed with a fluid coming from a boiler or such installation, such as a heat pump, for influencing the temperature of the fluid.

In a preferred embodiment, the present invention relates to a device, wherein one or more of said heat-conductive perforated columns is provided along its shaft with a zone of perforations such that when said device is positioned in said soil for cleaning, said zone of perforations corresponds to a layer of said soil containing contaminants.

The perforations are designed in order to allow a continuous air flow for extraction from the soil at any depth. Therefore the size and diameter/shape of the perforations is paramount to a smooth extraction of the vapors, combined with a thorough air flow control via the valve (element 10—FIG. 2). In a preferred embodiment, the columns have perforations in round, oval, square or longitudinal shape, which are comprised between 1 and 20% of the total surface, preferably between 2 and 25%, more preferably between 3 and 10%.

In a preferred embodiment, the present invention relates to a device, wherein said length, diameter and thickness are selected such that said one or more heat-conductive perforated columns are geothermal energy providing means. This has for effect that the columns act as geothermal piles.

The length of the pipe depends on the parameters required for use as a thermal heat-exchange and geothermal energy providing means. The length of the column preferably corresponds to the depth of the contamination in the soil to be treated. Moreover, the more energy savings are required from the geothermal system, the longer the columns need to be.

In a preferred embodiment, the present invention relates to a device, wherein said one or more columns have a length of at least 10 m, preferably at least 15 m, typically around 20 m. Preferably the outer pipe has a length of between 1 m and 100 m, more preferably between 10 m and 80 m, even more preferably between 15 m and 50 m, most preferably around 20 m. Preferably the inner pipe has a length equal to the length of the outer pipe less 50 cm.

In a preferred embodiment, the inner pipe has a length equal to the length of the outer pipe less 10 to 50 cm depending on the length of the outer tube. For smaller outer pipes, the inner pipe will be 10 cm shorter. For the longer outer pipes, the inner pipe length is up to 50 cm shorter than the outer pipe length.

The diameter of the column depends on its length. Where an inner pipe is used, this too determines the diameter to be selected for the column. The deeper the column and an inner pipe, the larger the diameter of the column needs to be.

Preferably, the diameter of the inner pipe is between 75% to 85% of the diameter of the outer column. Most preferably the diameter of the inner pipe is around 80% of the diameter of the outer column. The exact diameter is to be determined by an ad hoc calculation based on the air flow and mass balance required for the heating of the pipe and the soil around it. It also depends on the distance between the columns and the initial concentration and type of contaminants in the soil.

In a preferred embodiment of a device according to the invention and as shown in FIGS. 6 and 7, a heat retention material 36 is provided over a substantial part of the space created between the outer pipe and the inner pipe 17. Said heat retention material 36 is removable. This is advantageous as providing heat to the heat-exchange device can be interrupted when the heat retention material 36 reaches a certain temperature, at least 750° C. During heat interruption time, heat will be transferred from the heat retention material 36 to the column shaft and the surrounding soil. Heat will be again provided to the heat exchange columns when the temperature of the heat retention material 36 drops to a temperature of about 550° C. Thus, a regular intermittent heat pattern with cycles of heat delivery intervals followed by heat delivery interruption intervals, can be used which allows a considerable saving of energy. The time intervals of heat delivery and heat delivery interruption depend on the nature and the particle size of the used heat retention material and the dimensions of the space filled with said heat retention material. Heat retention material such as, but not limited to, alumina ceramic balls can be used as it is characterized by a good thermal conductivity, excellent insulating properties, high mechanical strength and low cost. The retention media could be also a thick metal or all other high thermal resistant material. The thickness of the metal is 5 to 15 mm. most preferably the thickness of metal is between 7 and 10 mm.

Figure 10:
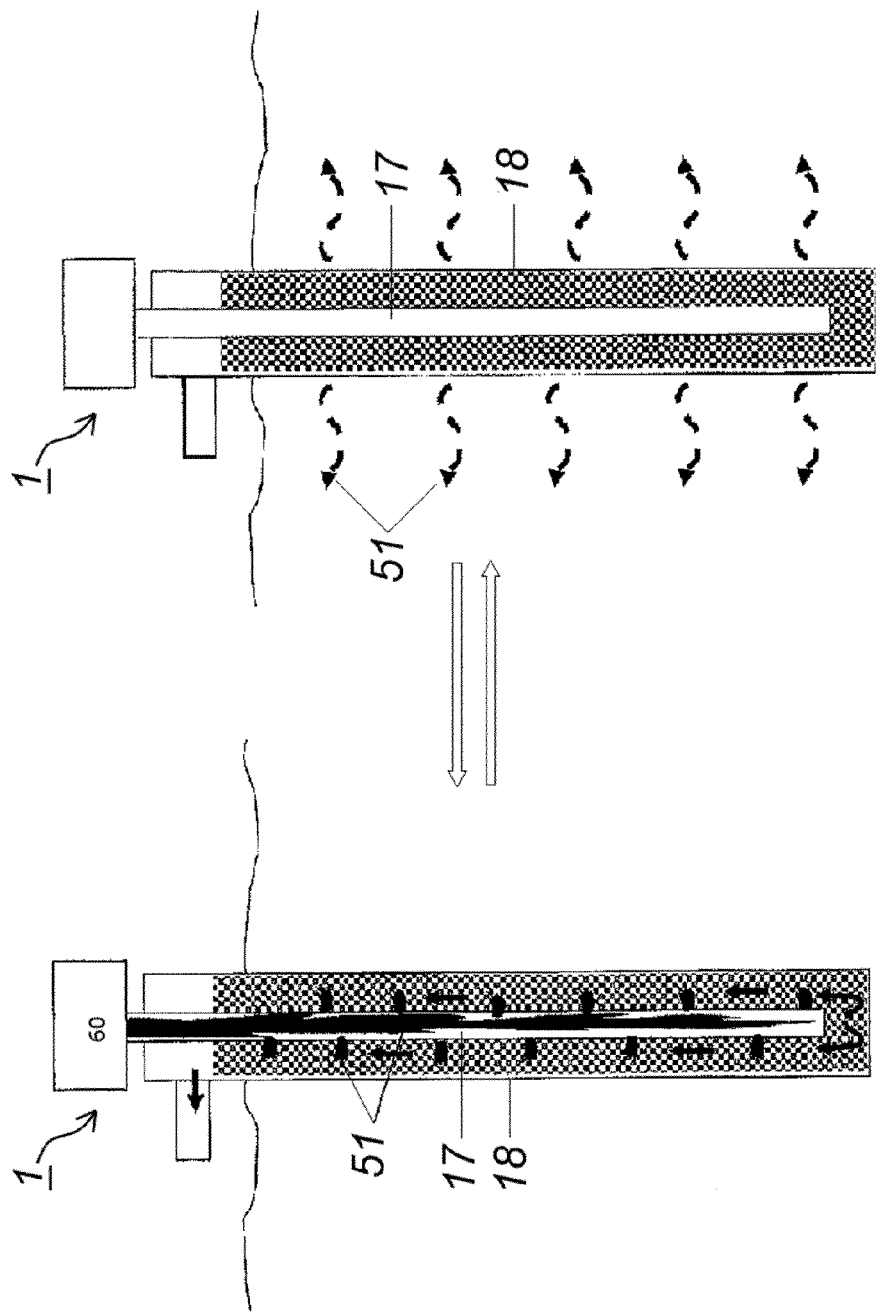
FIGS. 10*a* and 10*b* are an illustration of the regular intermittent heat pattern with cycles of heat delivery intervals followed by heat delivery interruption intervals according to an embodiment of the invention.

FIG. 10a is an illustration of the regular intermittent heat pattern during heat delivery interval according to an embodiment of the invention. Heat 60 is provided to the inner tube 17 which will result in the heating of the heat retention material (represented by the chequered zone) and of the non-perforated column 18.

FIG. 10b is an illustration of the regular intermittent heat pattern during heat delivery interruption intervals according to an embodiment of the invention. The heat 60 retained by the heat retention material (represented by the chequered zone) will be transferred through the non-perforated column 18 to the surrounding soil.

Figure 11:
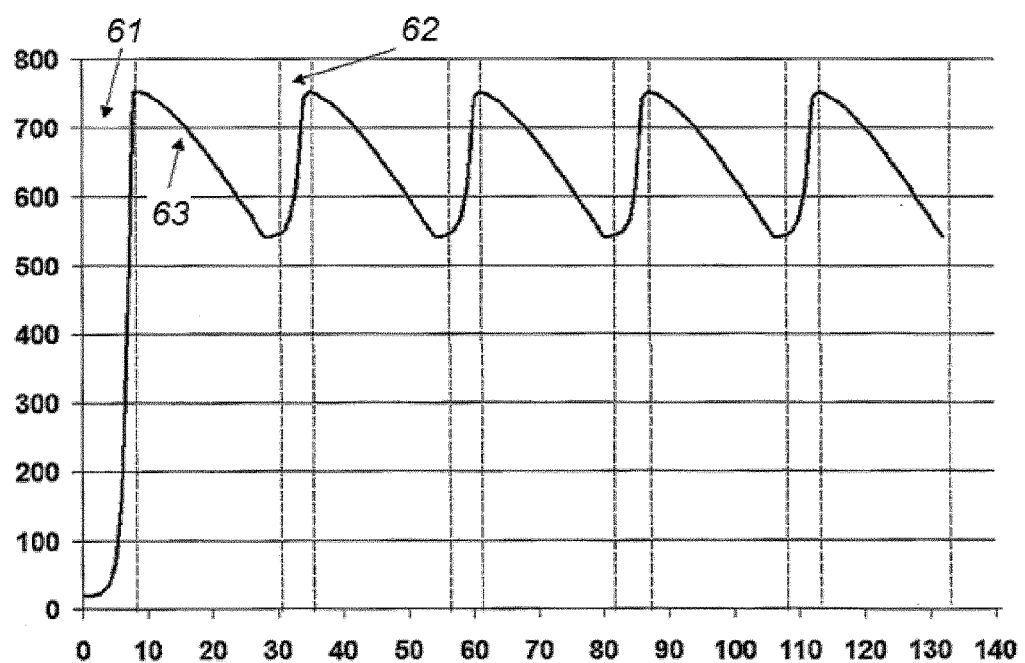
FIG. 11 is a graph showing the temperature cycles of the heat retention material during the heat delivery intervals and the heat delivery interruption intervals of the regular intermittent heat pattern according to an embodiment of the invention. The y-axis represents the temperature in ° C. of the heat retention material and the x-axis represents the time in min.

FIG. 11 is a graph showing the temperature cycles of the heat retention material according to an embodiment of the soil remediation device. During the initial heating phase 61 where heat is provided to the inner tube 17 for the first time, the temperature of the heat retention material is quickly increased and reaches 750° C. in about 10 min. At that stage, heat delivery interruption interval starts. Heat is no longer delivered to the inner tube 17 and heat is transferred from the heat retention material to the surrounding soil as shown in FIG. 10b. The temperature of the heat retention material will decrease gradually corresponding to a cooling phase 63. When the heat retention material temperature is about 550° C. (about 20 min later) the next heat delivery interval 62 starts. It is clear from the figure that the heat delivery interval is shorter than the heat delivery interruption interval, about 10 min and 20 min respectively. This is advantageous as it will result in a considerable energy saving.

The thickness of the column is preferably at least 3 mm. In a preferred embodiment of a device according to the invention, the column has a wall thickness of at least 3 mm, more preferably at least 5 mm, most preferably at least 10 mm. This thickness is advantageous for the column to be pushed in the soil instead of rotated in the soil. By pushing the column into the soil instead of rotating, optimal contact is achieved between the outer pipe and the surrounding soil. This has for effect that the column acts as a stability enhancing means for the surrounding soil. The improved contact with the soil improves heat transfer in the geothermal exploitation of the device.

In a preferred embodiment of a device according to the invention, the device comprises double shafted columns, comprising an outer column provided with an inner column. In a preferred embodiment of a device according to the invention, the non-perforated column is double shafted, comprising an outer column provided with an inner column. In a more preferred embodiment, said outer column is provided over a substantial part of its length with a fluid Introduction pipe. Preferably said outer column is of steel, more preferably stainless steel. Said inner column is replaceable. Preferably for the remediation phase the inner column, suitable as a fluid introduction pipe, is also of stainless steel. Preferably for the phase wherein the column is for the provision of geothermal energy, the inner column is of polyvinylchloride, abbreviated as PVC, or of high density polyethylene, abbreviated HDPE. Preferably, the thickness of the inner pipe is at least 1.5 mm, more preferably at least 2 mm, most preferably at least 3 mm.

Preferably, the length of the inner pipe is defined by the depth of the contamination in the soil to be treated and by the depth of the soil that is sufficient to cool/warm the liquid transported inside the lumen of said device to a desired temperature.

The outside surface of the shaft is shaped in a manner that enhances the friction factor of the pipe itself towards the surrounding soil and consequently increases the structural lift factor of the pipe.

By the term "structural lift factor" as used herein, is meant the capacity of the pipe to lift a certain amount of weight, based on the friction force exercised by said pipe with the surrounding soil. This friction force is the lift factor that allows structural weight to be put on it (such as a building).

A lift factor of a pipe suitable for use in the present invention depends on the weight of the building it is envisaged to support. Once the weights are known, a test at the site will need to be performed to determine how deep the pipe must be placed in order to provide enough lift factor for the envisaged building. Such a test is well-known to a person skilled in the art.

Columns of remediation device of the invention have a length which makes them suitable for geothermal and/or stability purposes. At the same time, due to the Improved friction, the length needed to reach the required lift factor per pipe is reduced.

In a preferred embodiment, the present invention relates to a device wherein said shaft has a smooth surface and is not provided with structures such as threads.

In a preferred embodiment of the invention, said double shafted stainless steel columns are connected to an oxidation unit comprising a heat exchanger and an oxidation device.

The heat exchanger may be used as a heating means for providing a heated fluid, preferably an air flow, to said double shafted stainless steel columns so that the outer shaft is heated, heat is exchanged with the surrounding soil, thereby volatilizing the contaminants present in said soil.

In a preferred embodiment, said heat exchanger is provided with a conduit for transferring heat.

The oxidation device may be of different designs, depending on on-site availabilities and limitations. Suitable designs for an embodiment of a device according to the invention, may be as follows.

In a preferred embodiment said oxidation device comprises an electrical pre-heating means, such as an electrical resistance. In a preferred embodiment said pre-heating means is an electrical resistance. An air/fuel mixture may be fed to said pre-heating device and heated to a temperature of at least 350° C. The heated mixture may be transferred to a catalytic oxidation device where the heated air/fuel mixture is heated further to temperatures between 650° C. and 750° C. The hot air mixture of a temperature between 650° C. and 750° C. is used as main heat source for the remediation process.

In another preferred embodiment said oxidation device comprises an electrical heating means, such as an electrical resistance. In a preferred embodiment said heating means is an electrical resistance. An air/fuel mixture may be heated to a minimum of 650° C.; preferably at least 750° C. This temperature is required for a complete and effective oxidation of the air-fuel mixture and sufficient energy transfer into the hot air flow. Said hot air flow may serve as main heat source for the remediation process.

In another preferred embodiment said oxidation device comprises a traditional flame combustion unit. In said unit an air/fuel mixture is oxidized to a temperature of at least 750° C. This temperature is required for a complete and effective oxidation of the air-fuel mixture. It allows that sufficient energy is transferred into the hot air flow so that it may serve as main heat source for the remediation process.

In a preferred embodiment of a device according to the invention, said device comprises at least one or more double shaft stainless steel columns (Unit D) drilled in the contaminated soil, connected to a surface-located device comprising a combustion, heating and control unit (Unit E) for heating and thereby cleaning said soil.

In a preferred embodiment of a device according to the invention, said device comprises at least one or more double shaft stainless steel columns (Unit D) drilled in the contaminated soil, connected to a surface-located device containing a combustion, heating and control unit (Unit E) for heating and thereby cleaning said soil. After cleaning of said soil, unit E is preferably disconnected from unit D and removed. From unit D, comprising said double shaft stainless steel columns, the inner tube is preferably removed together with unit E. The remaining outer column of unit D, enhances stability of the soil and provides superior stability while and after cleaning-up. The at least one or more outer columns are used as a substitute for piles or pillars.

In a preferred embodiment said unit E further comprises a circulation fan. By means of said circulation fan air flows may be regulated. Use of a circulation fan is advantageous for providing correct heat transfer into the soil. The circulation fan may also serve as extraction device for removing a contaminant vapor from said double shaft stainless steel columns.

In a preferred embodiment said unit F further comprises a fuel injection means. By the term "fuel" it is meant herein, liquid or gas. The fuel injection device may be used for injecting an amount of fuel into a cold air flow. The air flow comprising the fuel is led to the oxidation unit for oxidation. Preferably the oxidation takes place as close as possible to stoichiometry. When the chemical equilibrium of the combustion reaction is at stoichiometry, no excess fuel is present. Therefore no unburned fuel is present, which would go to waste. This is advantageous as consumption of fuel is reduced.

In a preferred embodiment said unit E further comprises a control and regulation means. Preferably said control and regulation means comprises a vapor extraction flow regulation valve, a fresh air inlet valve and a thermocouple.

Said vapor extraction flow regulation valve may be used for the regulation of the negative pressure applied to said soil in order to extract the vapors generated in the soil by heating. Said valve is advantageous for optimizing the heating process. Preferably the valve is closed at the beginning of the heating process. It is opened as the soil heats up and vapors start to be generated.

Said fresh air inlet valve may be used for the regulation of the amount of fresh air/oxygen put in unit E. This amount is preferably balanced with the amount of oxygen needed for a complete combustion of contaminants extracted from said soil. Preferably the amount remains in balance as well with energy released from the system, for example by releasing energy at an exhaust point.

Said thermocouple is for regulating the fuel injection as well as the air flow valves and as a main measure for a complete combustion.

In a preferred embodiment, said components of unit E are located in a containing box, more preferably in a containing box in which all voids are insulated, most preferably in a heat-insulated containing box used as fuel storage. Preferably said fuel storage stores a total of at least three days of combustion fuel. Use of a fuel storage is advantageous as it allows the remediation system (unit D in combination with unit E) to work without a fixed fuel feeding system. It improves flexibility and applicability of the process in on-site locations. It improves speed of implementation and start-up.

In another aspect, the invention relates to use of a device according to an embodiment of the invention, as a geothermal energy device. In a preferred embodiment of a use according to the present invention, said geothermal energy device is for heating/cooling a structure.

By the term "structure" as used herein it is meant surface structures including buildings, highways, airfields, runways, railway beds, fences, swimming pools, parking areas, and the like. In a preferred embodiment, said structure is a building, more preferably a house.

The invention provides a multiple purpose piping system incorporating a lumen designed for multiple functionalities such as a lumen of a soil remediation and geothermal heating/cooling device. As the outer columns can stay behind in the soil after the remediation process, part of the geothermal heating/cooling device is already in place, hence construction time is reduced. The re-use of materials reduces waists. It is an environmentally friendly method of construction. The total cost for remediation followed by the installation of a geothermal energy system can be reduced. The system provided is easily modifiable and straightforward in use.

Excavated Soil Remediation

In another aspect, the invention relates to use of a device according to an embodiment of the invention for soil remediation of an excavated soil. A thermal heat-exchange device according to an embodiment of the invention is characterized by the presence of a panel which is directly connectable to at least two perforated and non-perforated columns. The panel is used for the generation of a heated fluid and for the abatement of the soil contaminants.

The thickness of the column is preferably at least 1 mm. In a preferred embodiment of a device according to the invention, the column has a wall thickness of at least 1 mm, more preferably at least 2 mm, most preferably at least 3 mm. This thickness is advantageous for the column to be pushed in the soil instead of rotated in the soil. By pushing the column into the soil instead of rotating, optimal contact is achieved between the outer pipe and the surrounding soil. This has for effect that the column acts as a stability enhancing means for the surrounding soil. The improved contact with the soil improves heat transfer during the remediation.

In a preferred embodiment, the columns have a substantially round cross-sectional shape. In a particularly preferred embodiment, the columns have a substantially round cross-sectional shape and have a diameter which is comprised between 1 and 10 cm, preferably between 2 and 8 cm, more preferably between 3 and 7 cm. The diameter of the perforated columns can be kept quite low because their only purpose is to extract the gasses that are generated by the temperature increase (volatilization). Therefore, it requires only a very limited pressure drop and low flow rate as well. The diameter of the perforated columns is comprised between 1 and 15 cm, preferably between 2 and 10 cm, more preferably between 2.5 and 3.5 cm. When gravel is used as permeable medium the length of the columns can be further reduced.

Preferably, the diameter of the inner pipe is between 30% to 75% of the diameter of the outer column. Most preferably the diameter of the inner pipe is around 70% of the diameter of the outer column. The exact diameter is to be determined by an ad hoc calculation based on the air flow and mass balance required for the heating of the pipe and the soil around it. It also depends on the distance between the columns and the initial concentration and type of contaminants in the soil.

The length of the pipe depends on the parameters required for use as a thermal heat-exchange and geothermal energy providing means. The length of the column is preferably adjusted to the amount of soil to be treated. The columns have a length preferably between 3 and 100 m meter, more preferably between 5 and 75 m, most preferably between 10 and 50 m.

In a preferred embodiment of the invention, the distance between individual columns is between 0.5 m and 2.0 meters, preferably between 0.8 and 1.8 meters, preferably between 1.0 and 1.6 meters, most preferably around 1.5 meters.

The panel is provided with a heat source. Preferably the heat source provided in said panel, comprises a heat exchanger and an oxidation device. The heat exchanger serves as pre-heating device for fresh, cold, air required for combustion. The heat exchanger uses the exhaust combustion gasses, after they passed through the columns, as hot source in the exchange. The combustion comes after the heat exchanger and is based on heating up the by the heat-exchanger pre-heated air to a higher temperature, suitable to reach process temperatures in the columns and consequently through conduction in the soil.

The heat source is operable by means of gas, propane, liquid fossil fuels, other liquid or gas fuels as well as electricity. For this purpose, the panel is provided with a means for supply of a combustible and with a means for supply of electricity to said panel.

In a preferred embodiment said heat source is a catalytic heating device. The heating device comprises a heating plate of heat-resistant material, preferably a ceramic. Close to or on the surface of the plate, a mesh of oxidation catalyst, preferably a metal, more preferably a platinum based oxidation catalyst is provided. Near the mesh of oxidation catalyst a thermocouple 13 is provided. The heating device is further provided with a means for supply of fuel, such as a fuel inlet. The fuel inlet is positioned close to the surface of the oxidation catalyst. The heating device is also provided with a means for supply of electricity. The means for supply of electricity, such as an electrical element, is positioned outside of the panel.

In a preferred embodiment of the present invention the catalytic heating device is housed in a box-shaped metal body. The plate of heat-resistant material forms a wall in the box-shaped metal body. Preferably said heating plate is a perforated plate. Preferably the heating plate is made of a heat-resistant material. More preferably the heating plate is made of a ceramic material.

The horizontal surface of the plate is positioned perpendicularly to the longitudinal axes of the non-perforated and perforated tubes. The surface of the oxidation catalysts provided on top of the plate, is facing inwards towards the open end of the non-perforated and perforated column. Hence, the heat-resistant plate is facing outwards. This set-up is advantageous as the heat-resistant material serves as an isolation of the heat source from the external environment. A wall of panels of this set-up is advantageous. The contaminated soil undergoing treatment is thermally isolated. Thermal losses are reduced.

Providing the panel with a heat source is advantageous as it allows that heat is generated in close proximity of the perforated columns which are suitable for transport of the heat inside the contaminated soil. Heat losses may thereby be reduced. Heat losses are further reduced by also connecting the perforated columns to the heat source. Contaminant vapors extracted from the soil can thereby be transported, with a minimum amount of heat loss to the heat source where they can be destroyed. The use of flexible tubing is avoided.

In a preferred embodiment, the infrared catalytic panel is an infrared vented catalytic panel.

In a preferred embodiment, the present invention provides a thermal-heat exchange device wherein the at least one perforated column is connected to a vacuum means for extraction of the contaminant vapor from said soil. By a vacuum means it is meant herein, a device capable of providing a pressure deviating from atmospheric pressure.

In a more preferred embodiment the heating plate is made of a heat-resistant material having a plurality of microperforations orthogonal to the flat surface of the plate. This is advantageous as the volume provided by the microperforations may serve to connect the inside of the metal body where the heating takes place and oxygen is required to sustain the process, with the external environment. The spate provided by the microperforations provides conduits for leading air inside the box. Upon leaving the heat-resistant plate the air will meet the gas, resulting in an air/gas mixture for combustion.

The catalytic panel operates on the basis of a catalytic combustion. By the term "catalytic combustion" it is meant herein, a chemical oxidation reaction activated by means of a catalyst.

In a preferred embodiment, the present invention provides a thermal-heat exchange device wherein the at least one perforated column is provided in a material that is able to withstand the temperatures of the non-perforated column when heated and the at least one perforated column is provided over a substantial part of the length of the at least one non-perforated column.

The heating source, preferably a catalytic oxidizer or conventional burner, is located in the middle of the triangle formed by the columns. It is placed parallel to the columns themselves and the air exiting the oxidation device is sent through a stainless steel and well insulated pipe inside the panel to the open end of the inner pipe of the non-perforated pipe. Hence the heat is immediately transferred into said inner pipe and then to the closed-off end of the pipe where it returns to the panel via the space left between both non-perforated columns. It leaves those columns to be sent to a heat exchanger where that air is cooled to a lower temperature before release into the atmosphere. The cooling in the heat exchanger is heating up outside air before it enters the combustion device, preferably a catalytic oxidation or conventional burning device.

In another aspect the invention provides a method for remediating a soil comprising contaminants, comprising the steps of:

excavating a soil comprising contaminants,
introducing in said soil at least two perforated columns for contaminant extraction from said soil,
in close proximity of said at least two perforated columns introducing at least two non-perforated columns for providing heat to said soil,
connecting the at least two perforated and non-perforated columns to a single panel provided with heating means and extraction means,
sending an electric current to said panel thereby pre-heating said panel,
mixing air and gas to provide an air/gas mixture,
combusting said air/gas mixture on said pre-heated panel thereby obtaining a heated fluid,
transporting said heated fluid to said at least two non-perforated columns thereby heating said soil to a temperature sufficient to cause vaporization of said soil contaminants and obtaining a contaminant vapor,
extracting said contaminant vapor out of said soil into said at least two perforated columns,
removing said contaminant vapor from said at least two perforated columns, thereby providing remediated soil,
leading said contaminant vapor across said pre-heated panel thereby substantially destroying the contaminants comprised in said contaminant vapor.

The method of an embodiment of the present invention is characterized in that the means for heating, circulation, extraction and contaminant removal are provided in a panel. For the remediation process, the panel is connected to at least two non-perforated and perforated columns.

The method of the invention is characterized in that the off-gas treatment takes place in the panel. Contaminant vapor leaving the perforated tubes and arriving in the panel, contacts the oxidation catalyst. The contaminants are catalytically oxidized. The contaminant vapor is thereby substantially transformed into a fluid comprising carbon dioxide and water. The catalytic oxidation generates carbon dioxide and water vapor without emission of carbon monoxide, nitrogen oxides (NO and/or $NO_2$) and unburned hydrocarbons.

The start-up phase of the catalytic panel is obtained with an electrical element, which is heated a very short pre-heating time, typically limited to a few minutes. The pre-heating phase can be controlled with a thermocouple, placed inside the catalytic panel. The thermocouple sends a signal to the control panel upon reaching the necessary temperature conditions to start the catalytic combustion. As soon as the suitable temperature is reached, a gas feed is started in order to activate the catalytic combustion. The gas (combustible) flows inside the heater and reacts with the oxygen of the surrounding atmosphere. The contact of the fed combustible with the oxygen, through the catalytic panel duly pre-heated, generates a gas oxidation with the production of thermal energy. Suitable combustibles for use in this invention are propane and natural gas.

The electrical heating element used for the heater pre-heating is shut-down. That the electrical current supply can be switched off after a limited period of time is advantageous as energy costs can be reduced.

Air is supplied on the catalytic heater surface to provide for an efficient combustion. In a preferred embodiment of the method of the invention, the method comprises the step of leading outside air into the panel through canalizations positioned on the back of the heating means. In a preferred embodiment the infrared catalytic panel is provided with an integrated ventilation system or a forced air system through canalizations positioned on the back of the heating plate, for venting of the infrared catalytic panel.

The reaction is exothermic and develops heat through infrared radiation. Different temperatures can be obtained by changing the gas pressure and, as a consequence, the gas flow. In a preferred embodiment the surface temperature of the heating plate and consequently the wavelength of the emitted infrared rays, can be modulated to a temperature between 180° C. and 650° C. In a preferred embodiment the heating plate can provide a heating power between 6 kW and 25 kW. This is advantageous as it provides a maximum flexibility of application.

A combustion is obtained in absence of a flame, as the catalytic reaction takes place at a temperature below the ignition temperature of the gas. Consequently the catalytic panel may be used in potentially explosive atmospheres.

Preferably at least two walls are constructed to contain the excavated soil comprising contaminants. More preferably the at least two walls comprise stackable concrete profiles. The at least two walls are positioned in parallel allowing a wall of panels to be constructed between them. If required, at least two corner poles can be inserted to contain the panels. Preferably the concrete profiles are stacked up to provide a wall of up to three profiles high and up to four profiles in width. Preferably, the excavated soil and the panel are contained between stackable concrete profiles forming at least two walls.

In a preferred embodiment of the invention, the stackable concrete profiles are provided in the form of Lego-blocks or Lego-brick, that is of a rectangular shape with stubs on top and form matching holes in the bottom of the rectangular shape. This has the advantage that extra strength is provided to the wall when using this type of stackable profiles. The profiles are easy to stack, however they resist better to pressure exerted on the wall by soil leaning against the wall.

A device according to an embodiment of the invention is particularly suitable for use in the remediation of a contaminated soil. The heating source is provided closer to the columns compared to state of the art devices. The use of tubings, especially non isolated flexible tubing, is substantially reduced. Heat losses are reduced further. Energy savings allow for a cheaper and environmentally friendlier process.

The invention is further described by the following non-limiting examples which further illustrate the invention, and are not intended to, nor should they be interpreted to, limit the scope of the invention.

For instance, it should be clear that the principles of the present invention can also be applied to other solid materials which can thermally be treated in analogy to contaminated soil. Solid waste contaminated with volatile contaminants, such as for example metal scrap contaminated with oil, may also be cleaned using a device according to an embodiment of the invention. Consequently, the invention is useful in the field of remediation and material recycling.

The invention is further described by the following non-limiting examples which further illustrate the invention, and are not intended to, nor should they be interpreted to, limit the scope of the invention.

The general principle of a soil remediation device according to an embodiment of the invention is outlined in FIG. 1. FIG. 1 provides a top view on a heat-conductive column B provided with a concentric pipe A. Fluid can be introduced in the top of pipe A, travel towards the bottom of column B, exit the end of pipe A and travel back upwards again thereby heating the shaft of pipe A. Pipe A is provided in a heat-conductive material. The shaft gives off heat to the soil surrounding the shaft. In close proximity of pipe A, a column C is provided. The shaft of column C is perforated. Soil contaminants in the heated soil will be evaporated to provide a contaminant vapor. The vapor will be sucked into column C by a negative pressure applied on column C. The vapor enters column C through the perforations which are provided for this purpose. Alternatively, in close proximity of pipe A, a section of excavated soil is created (not depicted). Said section can be filled with vapor permeable material. The vapor will be sucked into said section of excavated soil by a negative pressure applied on said section.

FIG. 2 depicts an embodiment of a system for remediation of contaminated soil in situ according to the present invention. In this embodiment, the system comprises a unit D, E, F and G.

Unit D comprises an outer pipe which has been drilled substantially vertically in the soil. Its length is selected to penetrate both a region of the soil comprising contaminants 22 and a region substantially free of contaminants 23.

A non-perforated pipe 18 is provided with a perforated pipe 16 around a part of its shaft. The length of the perforated pipe 16 is selected to correspond with the depth of the soil that requires cleaning. The zone 19 of the perforated pipe provided with perforations corresponds to the layer of contaminated soil 22.

The pipe is non-threaded, which facilitates introduction of the pipe into the soil by means of pressure. The non-perforated pipe 18 is locked off at its lower side by a substantially cone-shaped body 20. This body or tip 20 can be affixed to the pipe by means of welding, brazing or by means of thread. The non-perforated pipe 18 extends deeper into the soil than the layer of contaminated soil 22. It also penetrates a second layer of soil, in particular of uncontaminated soil 23.

Unit E depicted in FIG. 2 comprises an inner tube 17 which is positioned inside the outer pipe 18. Together they form a double shafted pipe system. The inner tube is connected to the exit of an oxidation unit 5 and serves as guiding means for the fluid 8 leaving the oxidation unit. The oxidizer is preceded with an electrical (pre-) heating element 7. The heating element 7 is in turn connected to a heat exchanger 6. The latter has two entries and exits. On top, the heat exchanger 6 is connected to a circulation fan 21. The circulation fan 21 is connected to a conduit provided with a fresh air valve 11 for the entry of air from the environment. The spacing between the inner tube and outer tube is connected to a conduit 2 that is connected to an entry of the heat exchanger 6. At the opposite end, the heat exchanger 6 is connected to a conduit 12 for transporting a cooled air flow outside the system. A second conduit 14 connects the perforated zone 19 of the perforated pipe 16 to the entry of the vacuum system 21. The second conduit 14 is provided with a vapor extraction flow regulation valve 10. The entry of the inner tube 17 is provided with a thermocouple 13 for measurement of the temperature of the air flow entering the double shafted pipe 18, 17. The thermocouple 13 is connected to a fuel injection device 9 for regulation of the injection of fuel into the conduit connecting the ventilation fan with the heat exchanger 6. A suitable fuel for use in the invention is, for instance, propane.

Unit F is a connection means for connecting unit E to unit D. By means of unit F, unit D can be decoupled from unit E. The combination of unit D and unit E provides a soil remediation device 1. After the remediation process, it suffices to leave unit D behind in the soil and to dismantle and remove unit E. Unit D is then coupled to unit G. In case were the perforated pipes 16 are provided as separate pipes, as depicted in FIG. 3, they too may be removed.

Unit G is a network of tubes for the transportation of heat/cold fluid (not depicted). Preferably said fluid is water. To be able to transport said fluid in said network of tubes, a heat pump (not depicted) is connected to the network. The connection of unit D to unit E can be made by a connection means such as unit F.

Soil remediation is carried out as follows, with reference to FIG. 2. An flow of air is allowed to enter the nearly closed loop system 1 via fresh air inlet valve 11. It flows towards the heat exchanger 6. Prior to entry of the heat exchanger 6, fuel is mixed with the flow of cold air 3, using the fuel injection valve 9, and an air/fuel mixture is obtained. The air/fuel mixture is lead to the electrical (pre-) heating device 7. The air mixture can be pre-heated to a temperature of at least 350° C. or can be heated up to a temperature of at least 650° C. The heated air/fuel mixture 4 leaving the heat exchanger 6 is further heated by the catalytic oxidation device 5 to a temperature required for obtaining volatilization of the contaminants the contaminated soil layer 22. The hot air flow is send into the double shafted column 17, 18. It flows downwards towards the cone 20 and then back upwards. The heated air travels up again and is transported away by conduits 2, 12. The heated air heats the outer tube 18 and the surrounding soil 22. Contaminants present in the heated soil 22 volatilize providing a contaminant vapor. The vacuum system may comprise a vacuum pump, e.g. a fan 21, which is placed at the outer end of the collection pipe 12. This fan allows imposing a negative pressure to the perforated pipe 19 such that vaporized contaminants which have been formed in the soil can be drawn from the soil 22 into the perforated pipe 19 and circulated to an oxidation unit comprising an electrical (pre-)heating device 7 and an oxidizer 5. Contaminant vapor is carried away through conduit 14 via the ventilator 21 towards the entry of the heat exchanger 6. The remaining heat is at least partly re-used for warming up an air stream required for volatilizing more soil contaminants. The process is continued until the contaminated soil layer 22 is substantially freed of contaminants.

After the cleaning process, the soil remediation system 1 is shut down. Unit E including the inner tube 17, is decoupled from unit D, removed and dismantled. The non-perforated column 18 and perforated column 16 remain in the soil 22, 23.

To turn the remaining parts of the soil remediation device into a geothermal energy device, the lumen 31 of the former is used as a housing for a geothermal energy device.

The inner columns made of stainless steel are replaced by inner columns, preferably made of plastic, more preferably polyethylene, most preferably high density polyethylene. Alternatively columns made of polyvinylchloride are used to replace the inner columns.

The plastic columns are connected to a network of tubing (not displayed) located above the surface of the remediated soil. The tubings are suitable for the conduction of heat/cold fluid, preferably water. Preferably the network is placed horizontally with respect to the surface of the cleaned soil. For circulation purposes, the network of tubings for containing fluid is provided with a heat pump (not displayed). The connection to a heat pump can provide circulation of the fluid inside the network of tubings including the columns located in the treated soil thereby providing a geothermal energy device.

FIG. 3 is an illustration of another embodiment of a soil remediation system according to the present invention. The perforated column 16, used as a vapor passage way, is provided in close proximity of the heat-conductive column 18.

In a preferred embodiment of the invention, the part of the soil remediation system 1 which upon installation of the device into a contaminated soil is to remain above the surface of the soil, is provided in a box 30. The box 30 contains the heating module of the remediation device.

Referring to FIGS. 2, 3, 6 and 7, the heating module is a metal box 30 comprising an oxidation unit 5 connectable to an inner tube 17. The oxidizer 5 is provided with an electrical (pre-) heating element 7. The heating element 7 is in turn connected to a heat exchanger 6. The latter has two entries and exits. On top of the box 30, the heat exchanger 6 is connected to a circulation fan 21. The circulation fan is connected to a conduit provided with a fresh air valve 11. The heat exchanger 6 is connectable to a conduit 2 for the transportation of heated fluid from the heated inner and outer tube. At the opposite end, the heat exchanger 6 is provided with a conduit 12 for transporting a cooled air flow outside the box 30. A second conduit 14 is connectable to a perforated column. The connection is made to the entry of the vacuum system 21. The vacuum system 21 is provided with a vapor extraction flow regulation valve 10. The entry of the inner tube 17 is provided with a thermocouple 13 for measurement of the temperature of the air flow entering the double shafted pipe. The thermocouple 13 is connected to a fuel injection device 9 for regulation of the injection of fuel into the conduit connecting the ventilator 21 with the heat exchanger 6.

Figure 4:
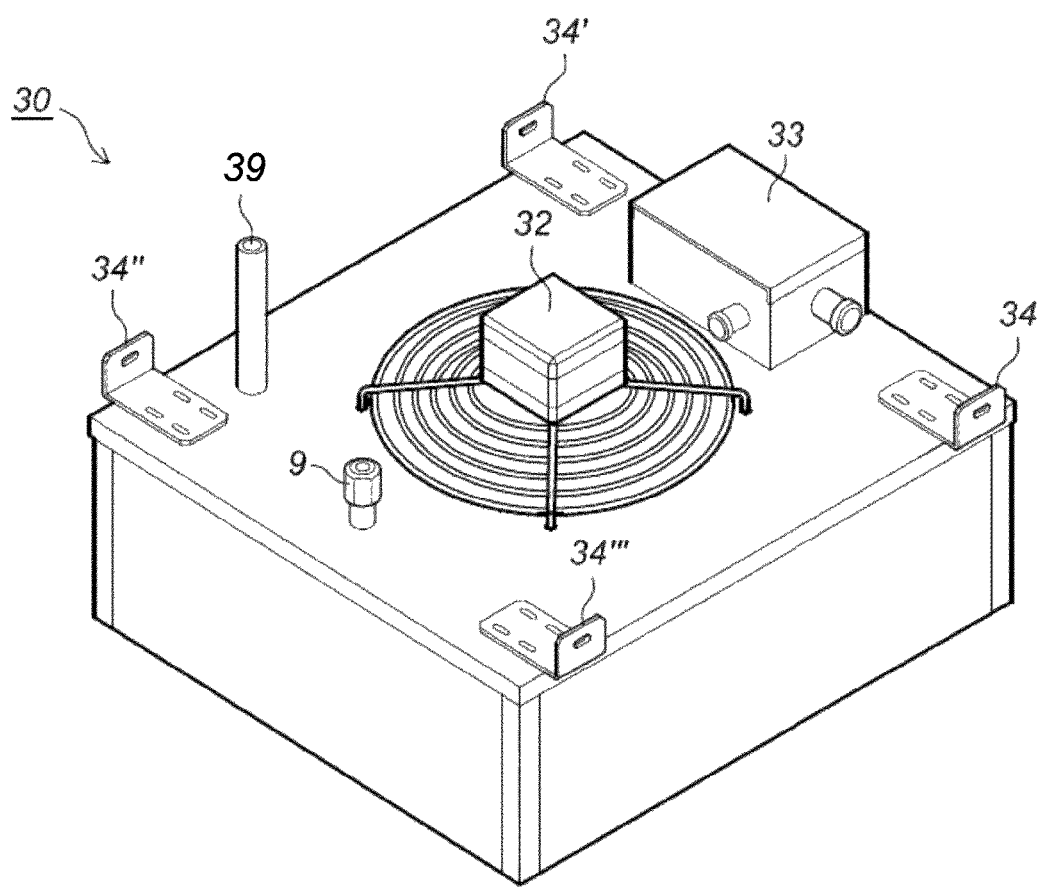
FIG. 4 represents a three-dimensional view on a heating module.
Figure 5A:
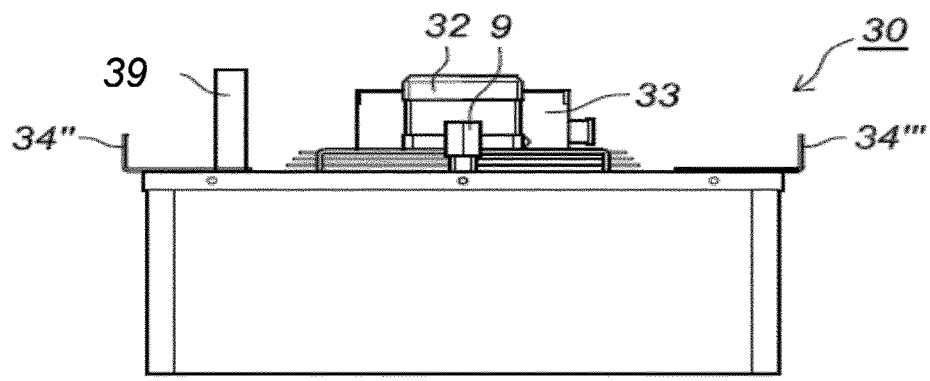
FIG. 5 is a schematic drawing of the heating module displayed in FIG. 4. Respectively a side view (FIG. 5a), top view (FIG. 5b), and front view (FIG. 5c) are provided.
Figure 5B:
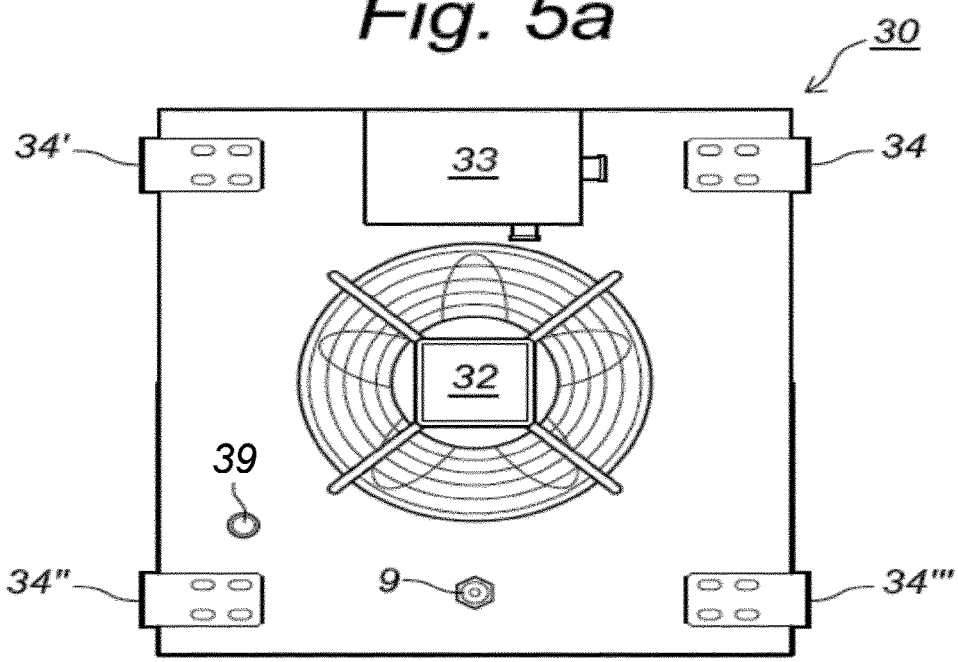
Figure 5C:
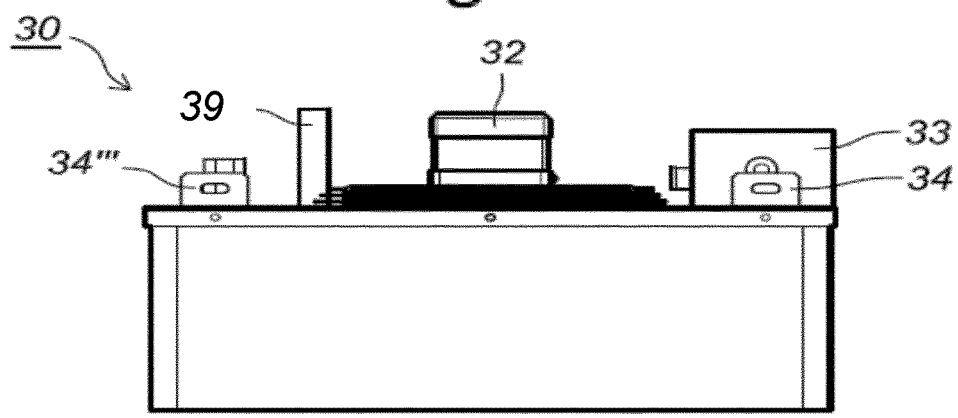

A three-dimensional representation of an embodiment of the box 30 is represented in FIG. 4. Further details are provided in the schematic drawings in FIG. 5. Referring to FIGS. 4 and 5, the box 30 comprises a wall provided with a fuel injection device 9, clean air exhaust 39, ID fan 32, a control unit 33, and four hooks 34, 34', 34", 34'".

FIG. 6 is an illustration of another embodiment of a soil remediation system according to the present invention. The vapor passage way is a section of excavated soil 35 and is provided in close proximity of the heat-conductive column 18. The section of excavated soil 35 is sealed at the top and is connected to the soil remediation device 1 by a connector 37. The section of excavated soil 35 can be filled with a vapor permeable material (not depicted). According to an embodiment of the invention, a part of the space between the outer pipe 18 and the inner pipe 17 can be filled with heat retention material 36.

FIG. 7 is an illustration of another embodiment of a soil remediation system according to the present invention. The vapor passage way is a section of excavated soil 38 wherein the heat-conductive column 18 is introduced. The section of excavated soil 38 is sealed at the top and is connected to the soil remediation device 1 by a connector 37. The section of excavated soil 38 can be filled with a vapor permeable material (not depicted). According to an embodiment of the invention, a part of the space between the outer pipe 18 and the inner pipe 17 can be filled with heat retention material 36.

Figure 9:
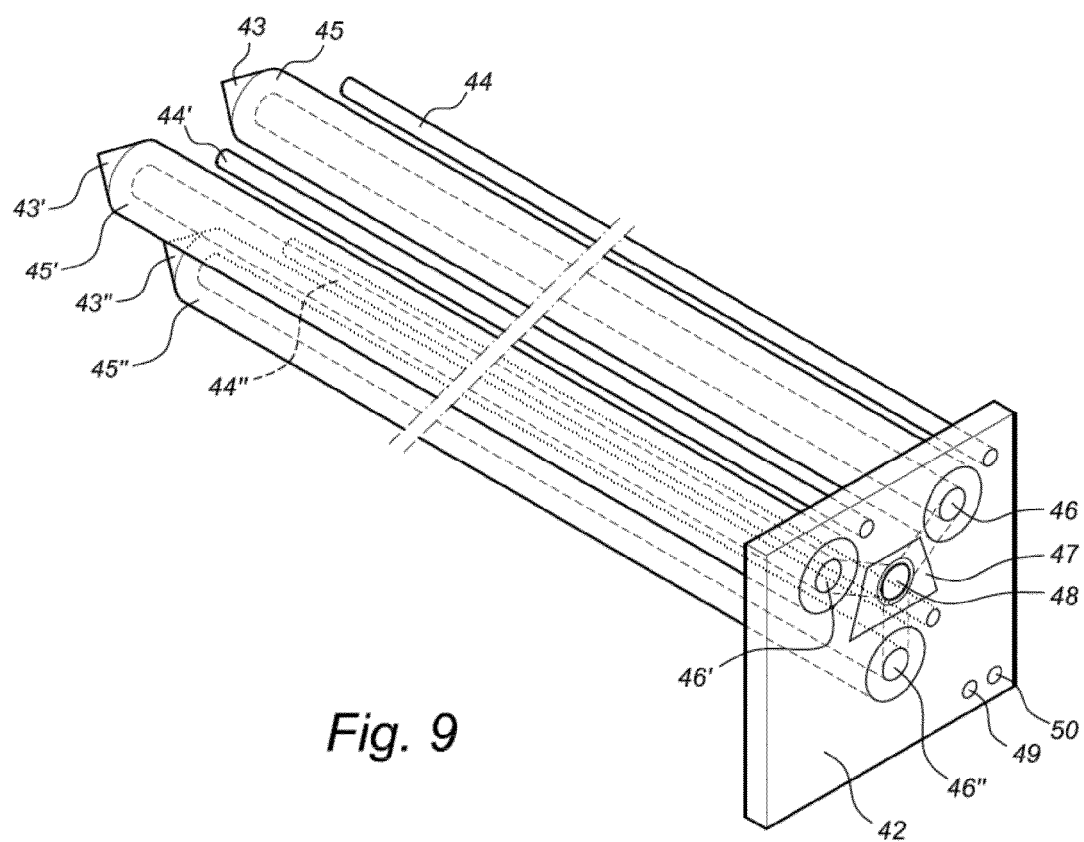
FIG. 9 is a three-dimensional schematic representation of an embodiment of a soil remediation device according to the present invention.

FIG. 9 provides a drawing schematically representing a soil remediation device according to an embodiment of the invention. Referring to FIG. 9 a soil remediation device is depicted comprising a panel 42 attached to three non-perforated columns 43, 43', 43" and three perforated columns 44, 44', 44". The non-perforated columns 43, 43', 43" comprise an outer tube of which the lumen 45, 45', 45" is provided with a concentric fluid introduction pipe 46, 46', 46". The pipes are connected to a heating chamber 47 provided in the panel 42. The heating chamber 47 is provided with a heating plate (not displayed). On the panel side opposing the side of the panel connected to the columns is a ventilator 48. The panel is provided with means for the supply of gas to the panel 49. The panel is further provided with means for the supply of electricity to the panel 50.

Figure 8:
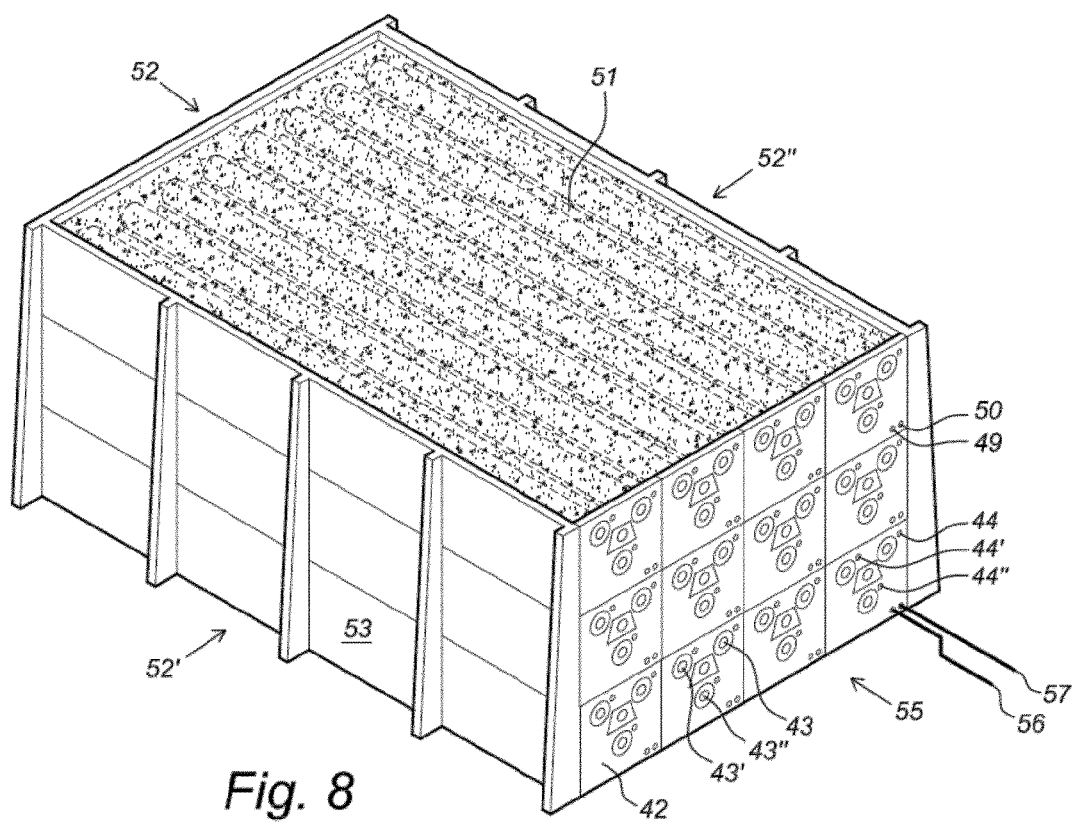
FIG. 8 is a schematic drawing representing a soil remediation system comprising a pile of soil enclosed within three walls of stackable concrete profiles and provided with a wall of soil remediation devices according to an embodiment of the invention.

FIG. 8 is a schematic drawing representing a soil remediation system using a device according to an embodiment of the invention. Referring to FIG. 8, a pile of excavated soil 51 is depicted enclosed within three walls 52, 52', 52" of stackable concrete profiles 53. The soil 51 piled up within the walls 52, 52', 52" is provided with non-perforated columns and non-perforated columns at regular intervals, typically the distance between individual columns is 1.5 meters. The pile of soil is closed off at the front by a wall of panels 55. Each panel 42 is attached to three sets of non-perforated 43, 43', 43" and perforated columns 44, 44', 44". Each panel is provided with means for gas supply 49 and electricity supply 50. The wall of panels is connected to a gas supply 56 and to an electricity supply 57.

Referring to FIGS. 8 and 9, a method according to an embodiment of the invention is as follows: non-perforated and perforated pipes are inserted into an excavated soil comprising contaminants. Preferably a first layer of soil is spread out on a treatment site, a first layer of pipes is placed on top, the pipes are covered with a second layer of soil, a second layer of pipes is placed on top, and so on. Concrete profiles are placed around the pile of contaminated soil as the pile gets higher and higher. The concrete profiles are preferably placed in an U-shape forming a box-like entrapment. Panels are placed in front of the box-like entrapment to close of the box-like entrapment. Each of the panels is connected to at least two, preferably three as depicted, non-perforated pipes for heating and two perforated pipes for collecting contaminant vapors. Each panel is connected through the means for supply of gas 49 and electricity 50 to a gas supply 56 and electricity supply 57.

Figure 12:
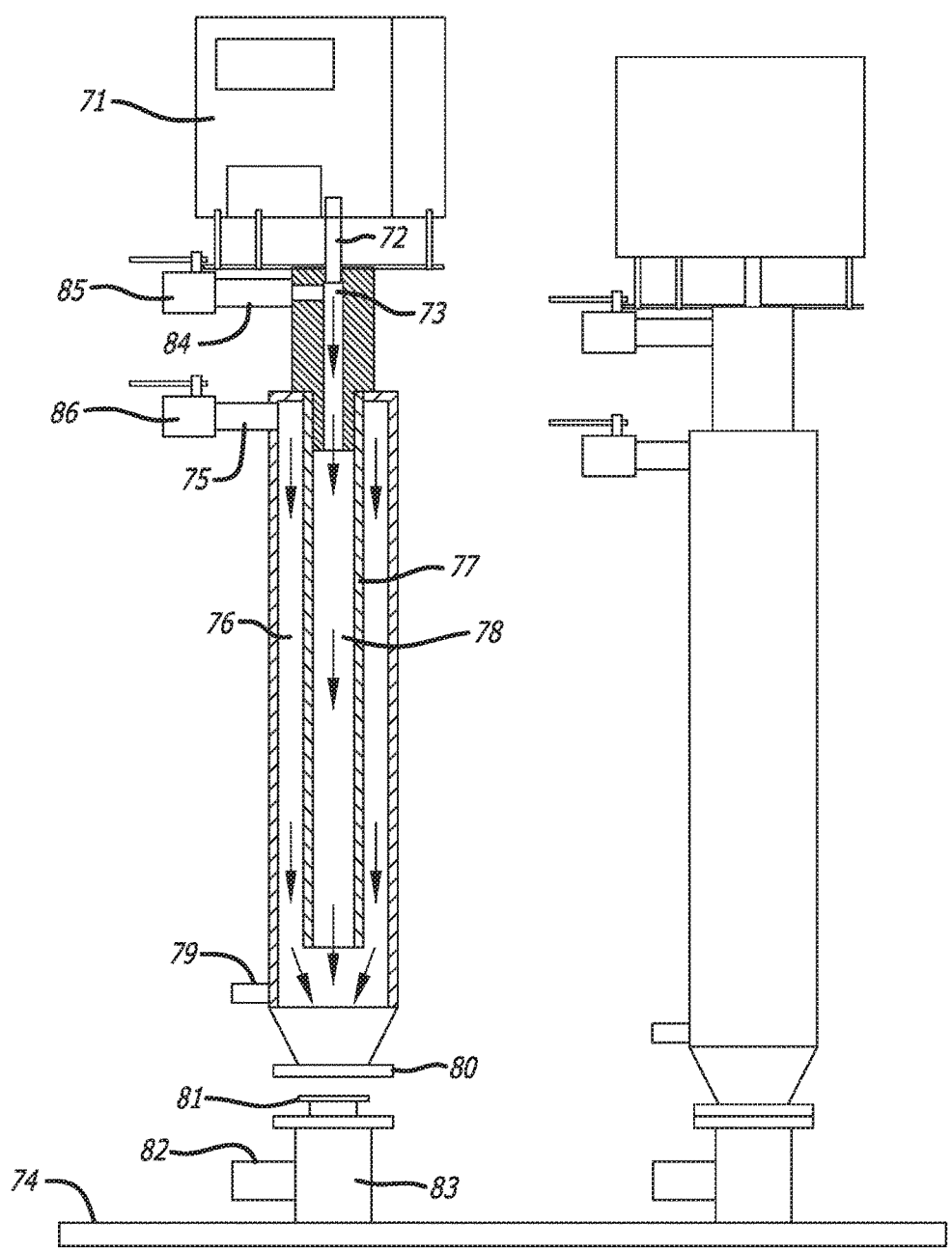
FIG. 12 is a schematic drawing of another embodiment of a device suitable for use in soil remediation according to a method of the invention.

FIG. 12 is a schematic drawing of a device suitable for use in a soil remediation method according to an embodiment of the invention.

The primary air is drawn through the tube 84. It is mixed in the tube 73 with gaseous fuel (propane or natural gas) from the injector 72. The flame is produced at the end of the tube 73 and in the combustion chamber (chamber formed by the refractory cement 77. At the exit of the combustion chamber, the gases (combustion products) are mixed with secondary air from the tube 75. The setting of the secondary air flow is conducted via the valve 86. This setting allows to cool the walls of the tubes 76 and 78 and to lower the gas temperature at the entrance of the inner tube 81 to 750-850° C. The valve 85 allows adjustment of primary air flow required for combustion of propane (or natural gas). The setting is made so as to have a significant amount of CO at the exit 82 of the heating pipe 83. The flange 80 allows connecting the device onto the heating pipe 83. The unit 71 of the burner has all the elements of control, security and deregulation of the flow of propane or natural gas (power heater). The vapors from the soil 74 are transported to the flame through tube 79.

The invention claimed is:

1. A method for removing a contaminant from soil, the method comprising
   introducing at least one perforated column into a contaminated region of the soil;
   introducing at least one non-perforated column into the contaminated region of the soil;
   heating the non-perforated column to create a contaminant vapor within the soil; and
   extracting the contaminant vapor via the perforated column, thereby providing remediated soil,
   wherein the non-perforated column is connected to a surface-located device comprising a combustion, a heating, and a control unit for heating and thereby cleaning the soil, and wherein the non-perforated column comprises:
   an inner wall;
   an outer wall positioned around the inner wall so as to create an annular space between the inner and outer walls;
   a combustion chamber located within the inner wall, the chamber having an entrance and an exit;
   a primary fluid inlet configured to inject a primary fluid into the entrance of the combustion chamber;
   a primary fluid inlet valve;
   a secondary fluid inlet configured to inject a secondary fluid into the annular space; and
   a secondary fluid inlet valve;
   wherein the secondary fluid inlet valve controls the flow of the secondary fluid through the annular space between the outer wall and the inner wall, and wherein the secondary fluid cools the temperature of the outer wall and the inner wall and lowers the temperature at the exit of the combustion chamber to 750-850° C.

2. The method of claim 1, further comprising
   providing the non-perforated column with fluid guiding means over part of its length; and
   coupling the fluid guiding means to a network of pipes connected to the surface-located heating device.

3. The method of claim 1, further comprising providing a negative pressure for the extraction of the contaminant vapor from the contaminated region of the soil.

4. The method of claim 1, further comprising providing heat to the non-perforated column in a regular intermittent pattern.

5. The method of claim 1, wherein the non-perforated column and the perforated column are connected to each other.

6. A device for the remediation of a soil comprising contaminants, the device comprising:
   a vapor passage way, connectable to a vacuum configured to extract a contaminant vapor from the soil;
   a non-perforated column comprising:
   an inner wall;
   an outer wall positioned around the inner wall so as to create an annular space between the inner and outer walls;
   a combustion chamber located at least partially within the inner wall, the combustion chamber having an entrance and an exit;
   a primary fluid inlet configured to inject a primary fluid into the entrance of the combustion chamber; and a secondary fluid inlet configured to inject a secondary fluid into the annular space; and a heat source connectable to the second end of the lumen for vaporization of the soil contaminants;

wherein the device is configured—using the primary and secondary fluids—to (1) maintain the temperature of a fluid at the exit of the combustion chamber at 750-850° C. and (2) maintain the temperature of the outer wall (76) at 48-105° C.

7. The device of claim 6, wherein the vapor passage way is a section of excavated soil.

8. The device of claim 6, wherein the vapor passage way comprises a perforated column.

9. The device of claim 6, wherein the non-perforated column comprises the heat source.

* * * * *